(12) United States Patent
Kemeny

(10) Patent No.: US 8,413,948 B2
(45) Date of Patent: Apr. 9, 2013

(54) DYNAMIC KINEMATIC MOUNT

(76) Inventor: Zoltan A. Kemeny, Tempe, AZ (US)

( * ) Notice: Subject to any disclaimer, the term of this patent is extended or adjusted under 35 U.S.C. 154(b) by 1851 days.

(21) Appl. No.: 11/022,498

(22) Filed: Dec. 22, 2004

(65) Prior Publication Data
US 2006/0054767 A1 Mar. 16, 2006

Related U.S. Application Data

(60) Provisional application No. 60/565,715, filed on Apr. 27, 2004.

(51) Int. Cl.
*F16M 13/00* (2006.01)
(52) U.S. Cl.
USPC .......................................... 248/566
(58) Field of Classification Search ............. 248/346.01, 248/346.06, 663, 566, 569, 570, 574; 52/167.5, 52/167.6
See application file for complete search history.

(56) References Cited

U.S. PATENT DOCUMENTS

| | | | | |
|---|---|---|---|---|
| 99,973 A * | 2/1870 | Touaillon | ...................... | 52/167.5 |
| 2,359,036 A * | 9/1944 | Harper | ........................ | 296/35.1 |
| 6,520,283 B2 * | 2/2003 | Kemeny | ........................ | 181/207 |
| 6,643,944 B2 * | 11/2003 | Yoda et al. | ........................ | 33/558 |
| 2001/0029010 A1 * | 10/2001 | Wells et al. | ........................ | 433/49 |

OTHER PUBLICATIONS

Kommernitz, Shock absorber for use with high voltage appts., 2 pages.*

* cited by examiner

Primary Examiner — Alfred J Wujciak
(74) Attorney, Agent, or Firm — Parsons & Goltry; Michael W. Goltry; Robert A. Parsons

(57) ABSTRACT

A dynamic kinematic mount includes three balls, a first plate, and an opposing second plate. The first plate contacts the three balls at six contact points constraining translational and rotational movement of the first plate, and the second plate contacts the three balls at six contact points constraining translational and rotational movement of the second plate. Also provided is a spacer having opposing first and second faces and three bores extending therethrough from the first face to the second face. The three balls are each disposed in one of the three bores for rotation relative to the spacer, in which the three ball project outboard of the first and second faces. The first plate is in juxtaposition to the first face, and the second plate in juxtaposition to the second face.

37 Claims, 26 Drawing Sheets

FIG. 1A
Prior Art
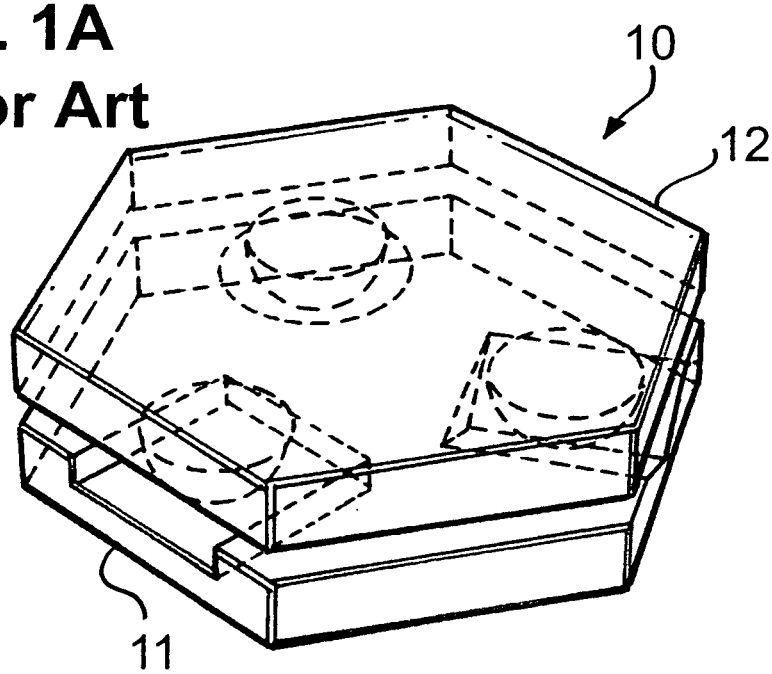
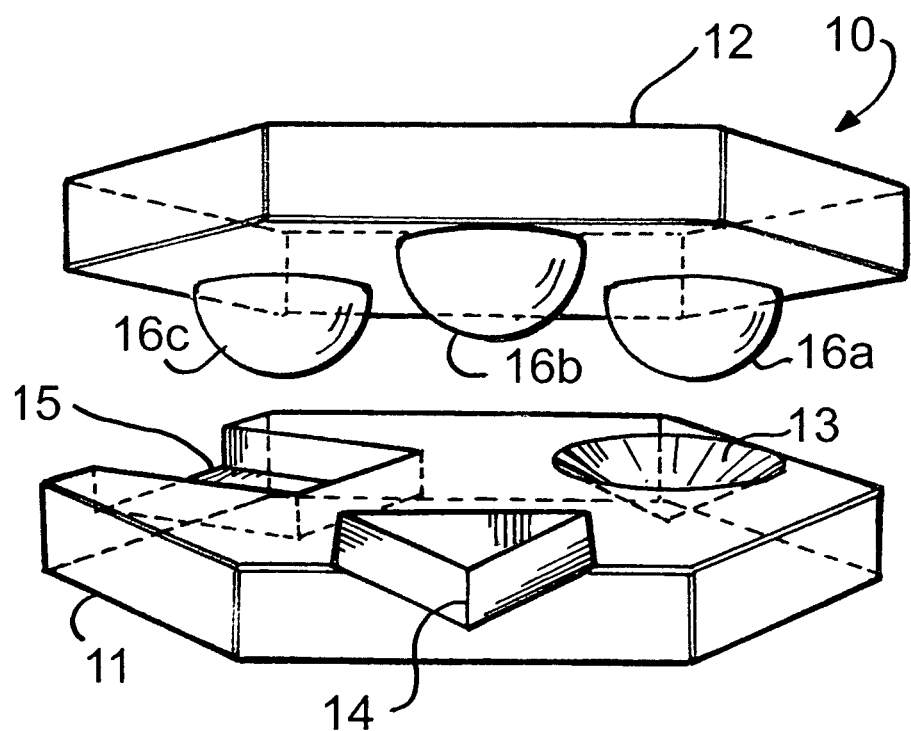
FIG. 1B
Prior Art

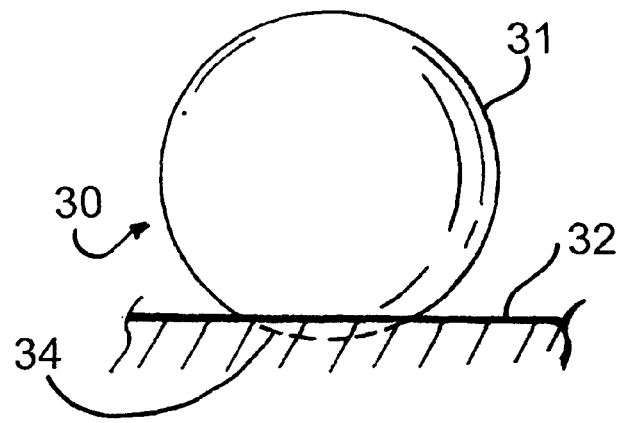
FIG. 3A
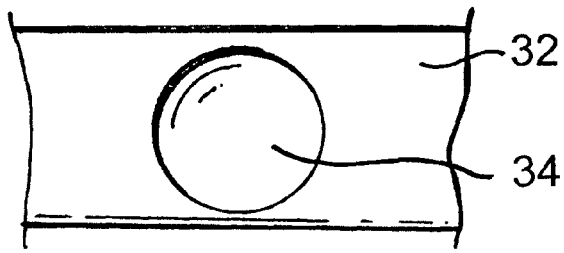
FIG. 3A'
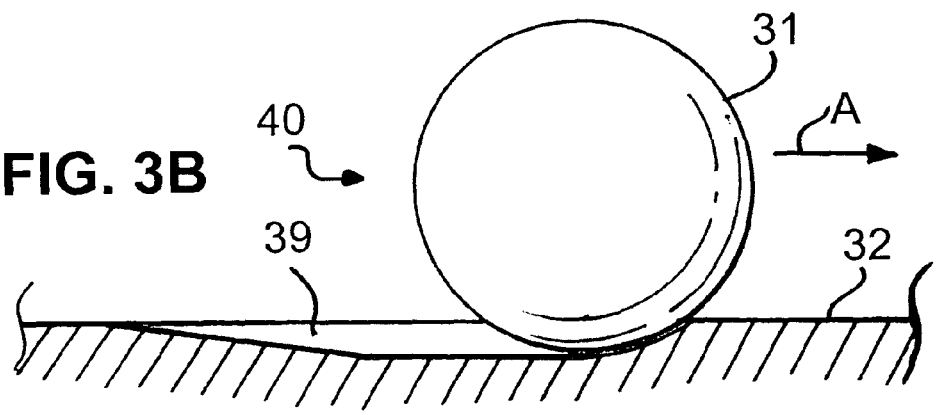
FIG. 3B
FIG. 3B'
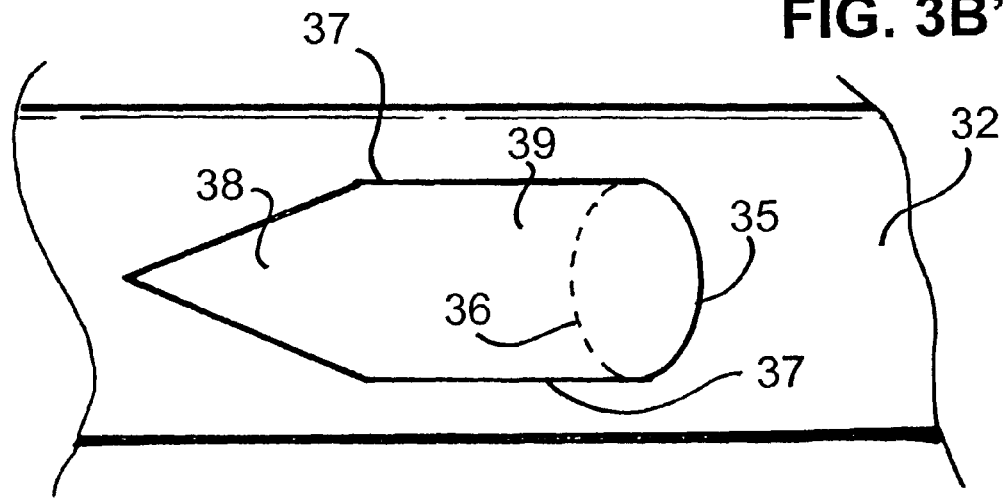

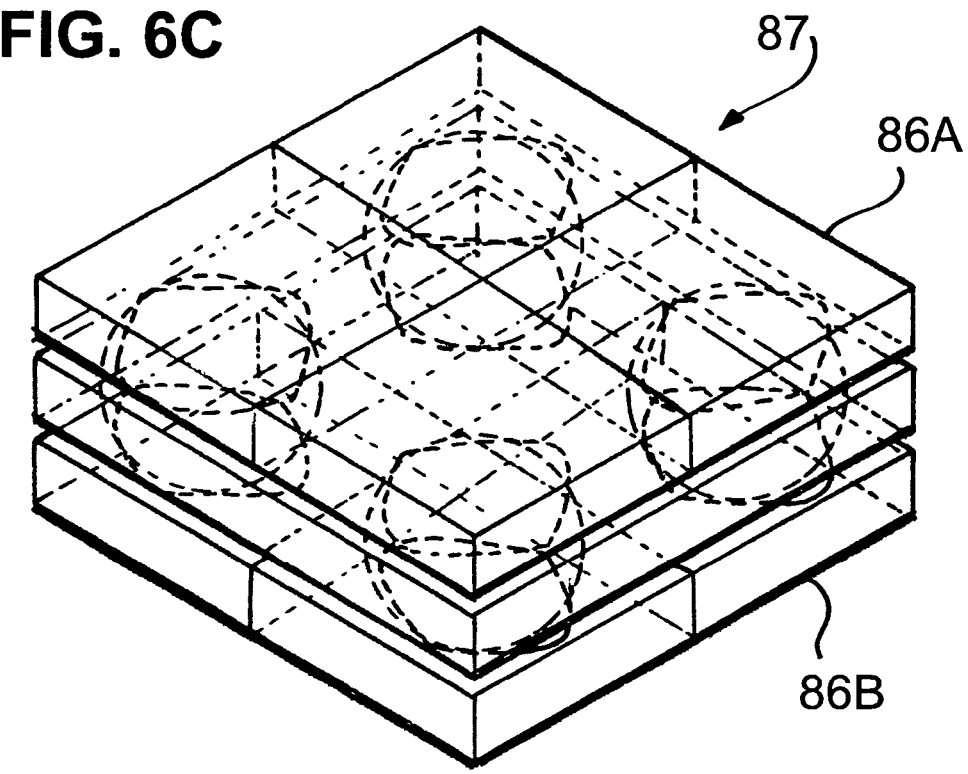
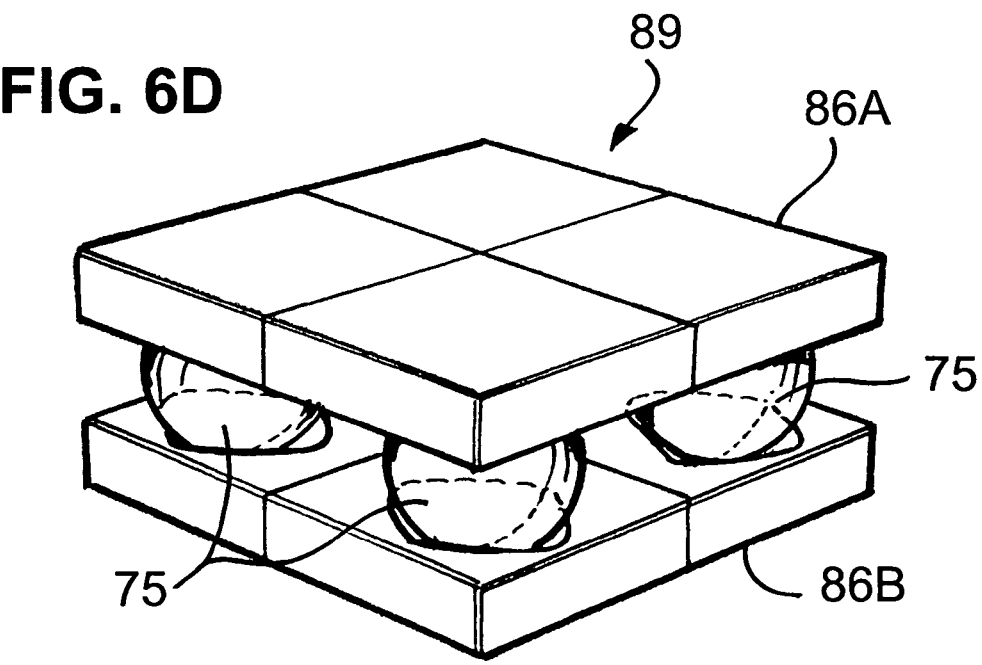

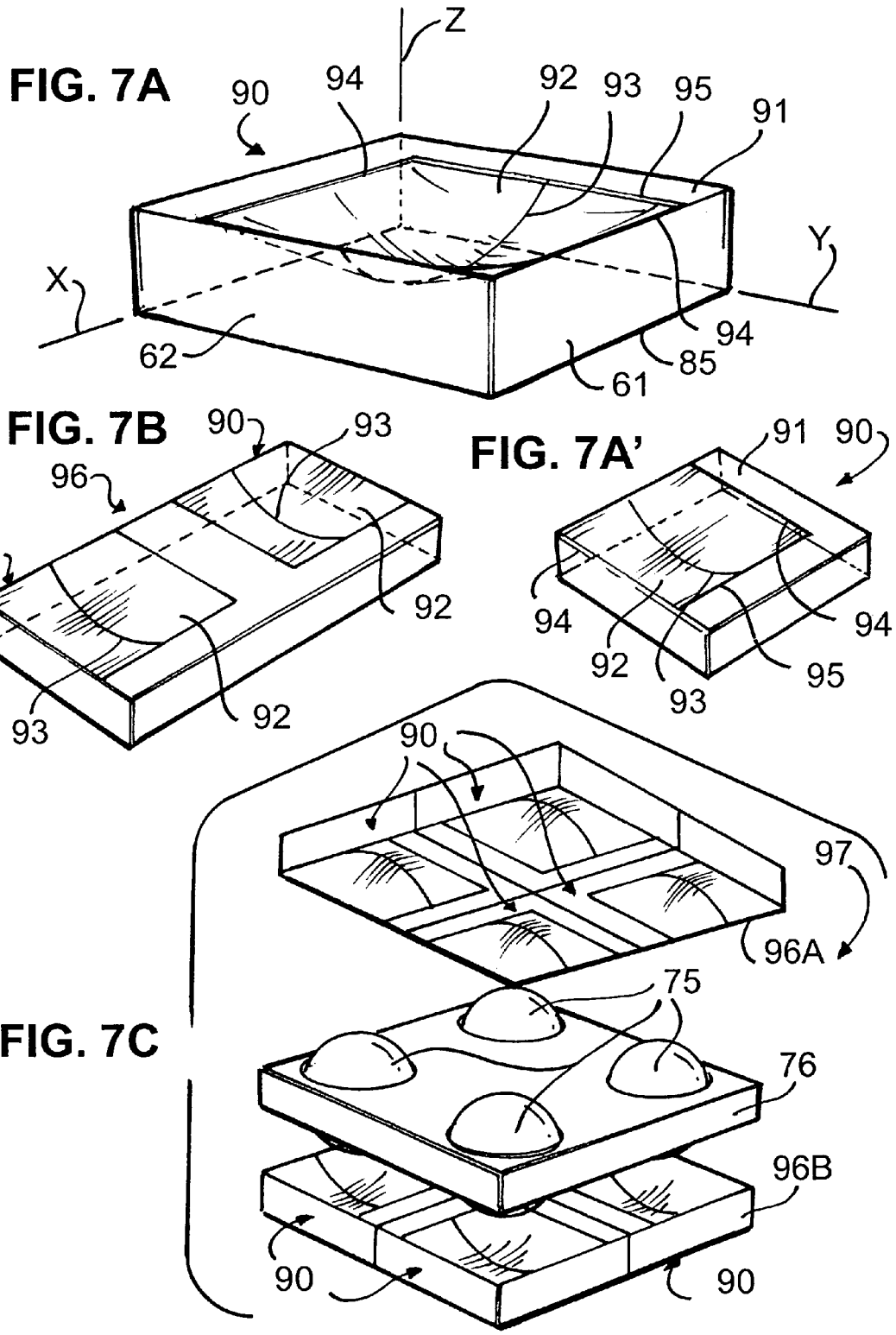

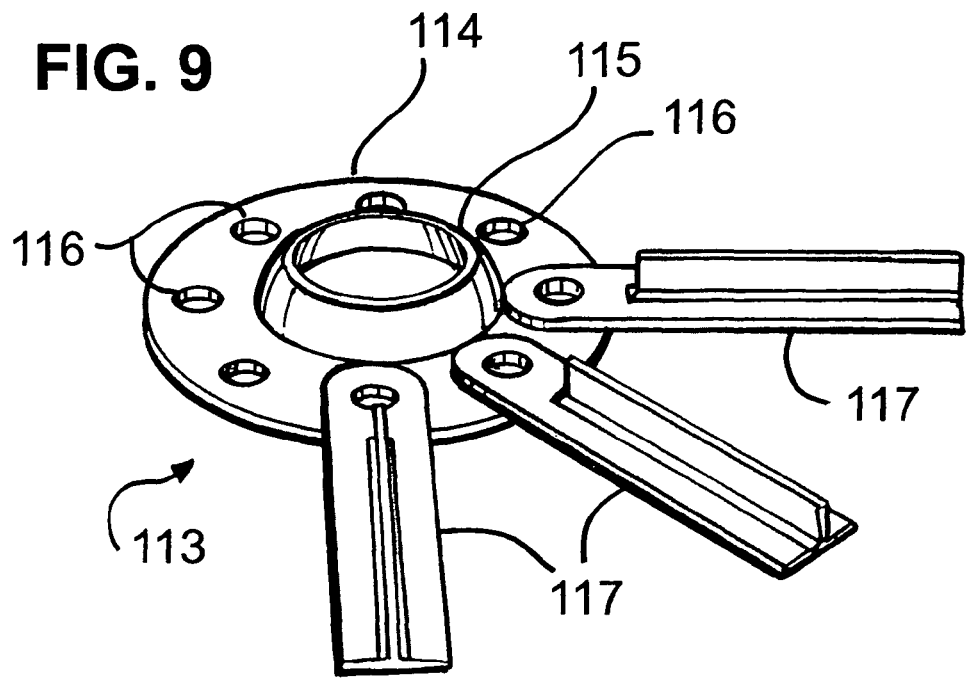
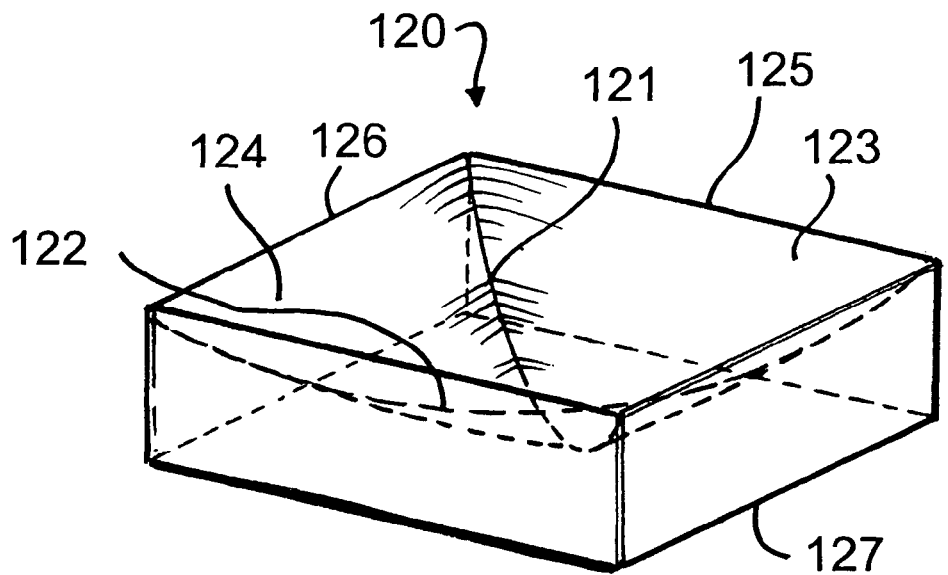

DYNAMIC KINEMATIC MOUNT

CROSS-REFERENCE TO RELATED APPLICATION

This application claims the benefit of U.S. Provisional Patent Application Ser. No. 60/565,715, filed Apr. 27, 2004.

FIELD OF THE INVENTION

The present invention relates to kinematic mounts.

BACKGROUND OF THE INVENTION

Kinematic mounts, otherwise known as kinematic couplings or constraints, are commonly used to couple measuring equipment or instruments to a base or substructure and for coupling rigid parts to hard mating surfaces, where despite repeated disassembly and reassembly the plates remain in the same relative position to one another as when previously assembled.

Three linear motions or translations (X, Y, Z) and three angular motions or rotations ($\theta_x$, $\theta_y$, $\theta_z$) are necessary to describe fully the motion and position of a solid body in space. For a rigid body to be completely fixed in space, despite repeated disassembly and reassembly, all six degrees of freedom need to be constrained. In other words, the three translations and the three rotations must be constrained with respect to some arbitrary fixed coordinate system. A mount is kinematic when all six degrees of freedom are constrained, in which any additional constraints would be redundant. Accordingly, a kinematic mount has six independent constraints.

Simple kinematic mounts use a cone or ball, a groove, and a flat in the front plate of the mount to constrain unwanted motion. The ball constrains motion in the X, Y, and Z axes. The groove constrains motion $\theta_y$ (pitch) and $\theta_x$ (roll). The flat constrains motion in $\theta_z$ (yaw). The chief disadvantage of cone/ball mounts is that some cross-coupling occurs between the translational and rotational axes because the rotational axes are not centered on the surface on the mounted part, which can cause significant translational errors.

A well-known kinematic mount incorporates a fixed base plate with three V-shaped grooves each forming an angle of approximately 120 degrees with each other groove. The walls of each groove form angles of approximately 45 degrees with the surface of the base plate. On a second plate, three convex spherical members are secured roughly in an equilateral triangular array. When the second plate is rested upon the first plate, each of the three convex spherical members rests within one of the three grooves, contacting the two side walls of each respective second plate, which may be lifted from the base plate and, when replaced, will occupy the identical position relative to the base, which normally remains fixed.

However, the above-described point contacts between each spherical member and groove leads to concentrated forces at these contact points. These concentrated forces lead to high stresses, know as Hertzian stresses, both at the spherical member and at the groove. Accordingly, while this prior art mount is sufficient for light loads, such as laboratory applications or light-duty field applications, it fails in heavy-duty applications, such as when used in space launch vehicles, bridges, buildings, and superstructures, where high intensity vibrations and shocks cause failure at the contact points.

Some kinematic mounts, which are often referred to as isolators, are designed to allow for a transient number of freedom changes (i.e., tilt and magnitude changes), and are used for motion isolation. The transient number of freedom changes is, in some instances, temporary. Typical tilts are those encountered by anchored marine oil rigs and rocket launchers. Typical magnitude changes are those encountered by the seismic base movement of celestial observation telescopes, mirrors, lens, and antennas.

Many skilled artisans have attempted to improve on rigid kinematic mounts by incorporating compliant features. For instance, one such mount incorporates constrained elastomer layers with the V-struts of a three-legged platform support employing ball-in-cone bearings. However, this arrangement is not capable of coping with transient tilts or magnitude variations unless these disturbances are microscopic or marginal. Thus, use of this mount is, unfortunately, limited to optical and semiconductor applications. Other efforts to introduce selected compliance in otherwise rigid kinematic mounts have also been attempted, with marginal or unacceptable results.

And so the current trend in the state of art of kinematic constraint mounting devices is to add compliance damping capabilities in order to balance transitive accelerations and to provide automatic re-centering, all without active control in the shortest time practicable and without imposing additional demands on otherwise used active control systems over the mount and without the need to reboot or reset such systems after the passing of acceleration disturbances. Some applications, such as the blast protection or terrorist hardening of control and command platforms and data centers, cannot afford to reboot and reset when the continuous operation of such systems is vital. The same holds for seismic protection of data, communications, and command centers. The continuous operability of mounted control devices in artificial gravity or induced centripetal fields in space stations is a rather obvious requirement in light of the fact that transients of such field are inevitable and may be frequent.

SUMMARY OF THE INVENTION

According to the invention, a dynamic kinematic mount includes three balls, opposing first and second plates, the first plate contacting the three balls at six contact points constraining translational and rotational movement of the first plate, and the second plate contacting the three balls at six contact points constraining translational and rotational movement of the second plate. A spacer has opposing first and second faces and three bores extending therethrough from the first face to the second face. The three balls are each disposed in one of the three bores for rotation relative to the spacer, and the three balls project outboard of the first and second faces. The first plate is in juxtaposition to the first face, and the second plate in juxtaposition to the second face. In a particular embodiment there is a fourth ball, in which the first plate contacts the fourth ball at a first contact point, and the second plate contacts the fourth ball at a second contact point, wherein at least one of the first and second contact points is a compliant contact point. Considering the fourth ball, the spacer is also furnished with a fourth bore, which extends through the spacer from the first face to the second face. The fourth ball is disposed in the fourth bore for rotation relative to the spacer, and projects outboard of the first and second faces of the spacer. The compliant contact point is provided by an elastomer at the contact point between the fourth ball and one of the first and second plates. In another embodiment, an elastoplastic material/layer is applied to the elastomer. The elastomer is carried by one of the fourth ball, the first plate, and the second plate. In a particular embodiment, the elastomer is provided in the form of an applied layer. In a particular embodiment, the first plate is fashioned from a plurality of rigidly-affixed blocks. In another embodiment, the second plate is fashioned from a plurality of rigidly-affixed blocks. In yet another embodiment, the first plate is fashioned of blocks held by, and secured to, a frame. In yet still another embodiment, the second plate is fashioned of blocks held by, and secured to, a frame.

According to the invention, another embodiment of a dynamic kinematic mount includes a spacer having opposing first and second faces and three bores extending therethrough from the first face to the second face. Three balls are each disposed in one of the three bores for rotation relative to the spacer, and the three balls project outboard of the first and second faces. A first plate in juxtaposition to the first face contacts the three balls at six contact points constraining translational and rotational movement of the first plate, and a second plate in juxtaposition to the second face contacts the three balls at six contact points constraining translational and rotational movement of the second plate. A fourth bore extends through the spacer from the first face to the second face. A fourth ball is disposed in the fourth bore for rotation relative to the spacer, projecting outboard of the first and second faces. The first plate contacts the fourth ball at a first contact point, the second plate contacts the fourth ball at a second contact point, and at least one of the first and second contact points is a compliant contact point. Preferably, the compliant contact point is provided by an elastomer at the contact point between the fourth ball and one of the first and second plates, in which the elastomer is carried by one of the fourth ball, the first plate, and the second plate. In a particular embodiment, an elastoplastic material/layer is applied to the elastomer. In a particular embodiment, the elastomer is provided in the form of an applied layer. In one embodiment, the first plate is fashioned from a plurality of rigidly-affixed blocks. In another embodiment, the second plate is fashioned from a plurality of rigidly-affixed blocks. In yet another embodiment, the first plate is fashioned of blocks held by, and secured to, a frame. In yet still another embodiment, the second plate is fashioned of blocks held by, and secured to, a frame.

According to the invention, yet another embodiment of a dynamic kinematic mounts includes three balls, at least one additional ball comprising a fourth ball, a first plate, and an opposing second plate. The first plate contacts the three balls at six contact points constraining translational and rotational movement of the first plate, and the second plate contacts the three balls at six contact points constraining translational and rotational movement of the second plate. The first plate contacts the fourth ball at a first contact point, the second plate contacts the fourth ball at a second contact point, and at least one of the first and second contact points is a compliant contact point. Further to this embodiment is a spacer having opposing first and second faces and four bores extending therethrough from the first face to the second face. The three balls and the fourth ball are each disposed in one of the four bores for rotation relative to the spacer, and the four balls project outboard of the first and second faces. The first plate in juxtaposition to the first face, and the second plate in juxtaposition to the second face. Preferably, the compliant contact point is provided by an elastomer at the contact point between the fourth ball and one of the first and second plates. In a particular embodiment, an elastoplastic material/layer is applied to the elastomer. The elastomer is carried by one of the fourth ball, the first plate, and the second plate. In a particular embodiment, the elastomer is provided in the form of an applied layer. In a particular embodiment, the first plate is fashioned from a plurality of rigidly-affixed blocks. In another embodiment, the second plate is fashioned from a plurality of rigidly-affixed blocks. In yet another embodiment, the first plate is fashioned of blocks held by, and secured to, a frame. In yet still another embodiment, the second plate is fashioned of blocks held by, and secured to, a frame.

According to the invention, yet a further embodiment of a kinematic mount includes a spacer having opposing first and second faces and bores extending therethrough from the first face to the second face, three balls, and at least one additional ball comprising a fourth ball. The three balls and the fourth ball are each disposed in one of the bores for rotation relative to the spacer, and the four balls project outboard of the first and second faces. A first plate is in juxtaposition to the first face and contacts the three balls at six contact points constraining translational and rotational movement of the first plate. A second plate is in juxtaposition to the second face and contacts the three balls at six contact points constraining translational and rotational movement of the second plate. The first plate contacts the fourth ball at a first contact point, the second plate contacts the fourth ball at a second contact point, and at least one of the first and second contact points is a compliant contact point. Preferably, the compliant contact point is provided by an elastomer at the contact point between the fourth ball and one of the first and second plates. The elastomer is carried by one of the fourth ball, the first plate, and the second plates. In a particular embodiment, an elastoplastic material/layer applied to the elastomer. In a particular embodiment, the elastomer is provided in the form of an applied layer. In a particular embodiment, the first plate is fashioned from a plurality of rigidly-affixed blocks. In another embodiment, the second plate is fashioned from a plurality of rigidly-affixed blocks. In yet another embodiment, the first plate is fashioned of blocks held by, and secured to, a frame. In yet still another embodiment, the second plate is fashioned of blocks held by, and secured to, a frame.

Consistent with the foregoing summary of preferred embodiments and the ensuing disclosure of best modes for practicing the invention, which are to be taken together as the disclosure of the invention, the invention also contemplates other apparatus and method embodiments.

BRIEF DESCRIPTION OF THE DRAWINGS

Referring to the drawings:

FIG. 1A is an isometric view of a prior art kinematic mount shown as it would appear locked;

FIG. 1B is an isometric view of the prior art kinematic mount of FIG. 1A shown as it would appear unlocked;

FIG. 2B' is a vertical sectional view of a ball contacting opposing cavities, in accordance with the principle of the invention;

FIG. 3A is a partially schematic side elevational view of a contact condition including a ball in contact with a flat;

FIG. 3A' is a top plan view of a footprint left in the flat of FIG. 3A by the ball;

FIG. 3B is a partially schematic side elevational view of a contact condition including a ball and a track left in a flat from the ball, in accordance with the principle of the invention;

FIG. 3B' is a top plan view of the track left in the flat of FIG. 3B by the ball, in accordance with the principle of the invention;

FIG. 6A' is a schematic representation of a contact geometry of the building block of FIG. 6A;

FIG. 6C is an isometric view of the kinematic mount of FIG. 6B shown as it would appear locked;

FIG. 6D is an isometric view of a kinematic mount shown as it would appear locked and including balls positioned between opposing base plates each constructed from the building blocks of FIG. 6A, in accordance with the principle of the invention;

FIGS. 7A and 7A' are isometric views of another alternate embodiment of a building block for use in constructing plates for kinematic mounts, in accordance with the principle of the invention;

FIG. 7B is an isometric view of yet another alternate embodiment of a building block for use in constructing plates for kinematic mounts, in accordance with the principle of the invention;

FIG. 7C is an isometric view of a kinematic mount, constructed and arranged in accordance with the principle of the invention and shown as it would appear unlocked, including opposing plates each fashioned as an assembly of the building blocks of FIG. 7B, and a spacer disposed therebetween maintaining four balls;

FIG. 9 illustrates a truss assembly that may be employed with a kinematic mount constructed and arranged in accordance with the principle of the invention;

FIG. 10 is an isometric view of another embodiment of a building block for use in constructing plates for kinematic mounts, in accordance with the principle of the invention;

DETAILED DESCRIPTION OF PREFERRED EMBODIMENTS

Disclosed herein are kinematic mounts that are capable of balancing large transitive magnitudes and tilt changes in natural and artificial gravity environments, and in acceleration fields, without excessive displacements, and that are able to quickly, efficiently, and automatically re-centering after such disturbances are over, which reduces or otherwise substantially eliminates the demand on active control over such mounts and ensures operability of electronics and mechanical systems over such mounts.

Figure 1C:
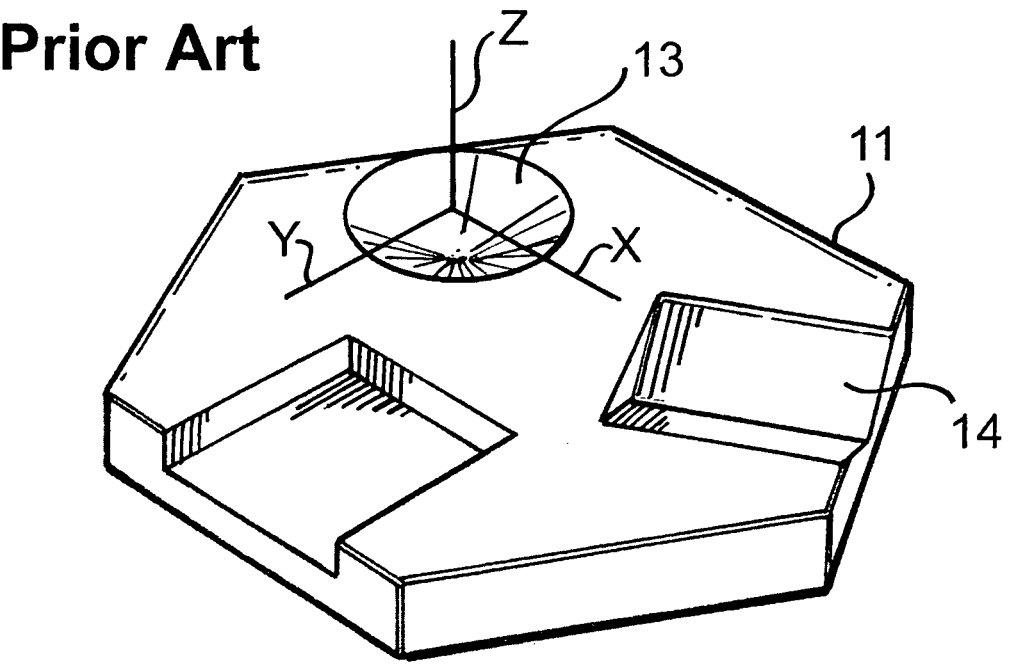
FIG. 1C is a top isometric view of a plate of the kinematic mount shown in FIG. 1A.

Referring now to the drawings, in which like reference characters indicate corresponding elements throughout the several views, attention is first directed to FIGS. 1A-D, which illustrate, in relevant part, a prior art kinematic mount 10 incorporating opposing rigid plates 11 and 12. For ease of discussion, plate 11 is considered a first plate and plate 12 is considered a second plate. First plate 11 has three cavities 13,14,15 formed therein, which are disposed roughly in an equilateral triangular array. Second plate 12 carries three thrust bearings or balls 16a,16b,16c, which are rigidly secured roughly in an equilateral triangular array. FIG. 1B shows kinematic mount 10 as it would appear unlocked, and FIG. 1A shows kinematic mount 10 as it would appear locked, in which balls 16a,16b,16c rest in and engage cavities 13,14,15, respectively. An acceleration field, such as gravity, locks kinematic mount 10.

Plates 11 and 12 have parallel back surfaces, which are each perpendicular to the direction of the acceleration field. Plate 11 is typically fixed, and is considered a base plate. Plate 12 is presented against plate 11 by the acceleration field. Typically, an object, which is not shown, is superimposed on plate 12 and acts as payload on plate 12. The object can be an instrument, a fixture, a structural support, etc. The payload applied to plate 12 can be augmented with an additional, applied external influence, such as with a hydraulic assembly, a spring, etc.

Referring to FIGS. 1B and 1C, cavity 13 is conical, cavity 14 is crested, and cavity 15 is flat. Cavity 13 is referred to as a cone, cavity 14 is referred to as a groove, and cavity 15 is referred to as a plane or recess. Balls 16a,16b,16c face, and are positionable in, cavities 13,14,15, respectively. When kinematic mount 10 is locked as shown in FIG. 1A, the surface of ball 16a touches the surface of cavity 13 at three points (or in a circle of three points called crown points), the surface of ball 16b touches cavity 14 at two points, and the surface of ball 16c touches cavity 15 at one point. These six contact points are rigid contact points.

Figure 1D:
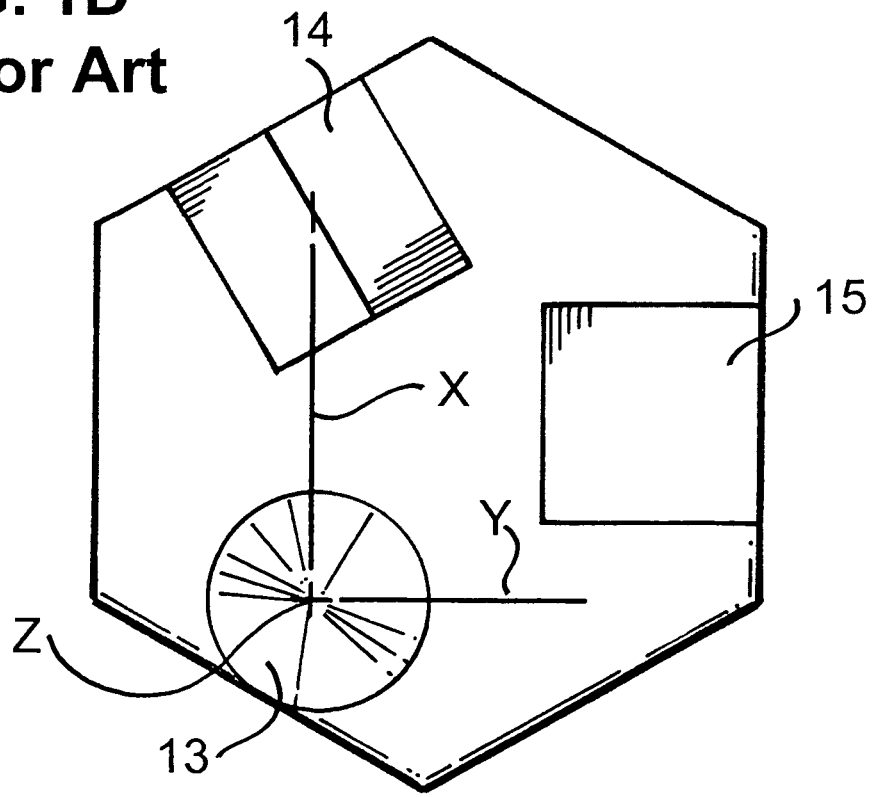
FIG. 1D is a top plan view of the plate of FIG. 1C.

FIGS. 1C and 1D show the X, Y, and Z coordinate system of plate 11. The X axis passes through the center of cavities 13 and 14, the Y axis passes through the center of cavity 13 and is perpendicular to the X and Z axes, and the Z axes is perpendicular to the Y axis and parallel to the direction of the acceleration field. In some instances, the geometry of plate 11 can be adapted and arranged for causing the Y coordinate to pass over the geometric center of plate 11.

Plates 11 and 12 each have six degrees of freedom to move relative to each other, including the three translations along the X, Y and Z axes, and the three rotations around them, namely, $\theta_x$ (roll), $\theta_y$ (pitch), and $\theta_z$ (yaw), respectively. The three contact points between ball 16a and cavity 13 constrain motion of plates 11 and 12 in the three X, Y, and Z translations. Thus, ball 16a and cavity 13 are the primary constraint of kinematic mount 10. The two contact points between ball 16b and cavity 14 constrain motion of plates 11 and 12 in $\theta_y$ (pitch) and $\theta_x$ (roll), respectively. Ball 16a and cavity 14 are the secondary constraint of kinematic mount 10. Finally, the single contact point between ball 16c and cavity 15 constrains motion of plates 11 and 12 in $\theta_z$ (yaw). Ball 16c and cavity 15 are as the tertiary constraint of kinematic mount 10. Those of ordinary skill will readily appreciate that kinematic mount 10 is rigid, and therefore cannot balance angular and magnitude disturbances of the acceleration field functioning to lock plates 11 and 12 together.

In accordance with the principles of the invention, disclosed herein are preferred embodiments of kinematic mounts that can balance angular and magnitude disturbances in the acceleration field. Preferred embodiments of kinematic mounts constructed and arranged in accordance with the principle of the invention include rotating balls, rotating balls maintained by a spacer positioned between opposing plates, and/or redundant contact points incorporating compliant features in combination with six rigid contact points.

Figure 2A:
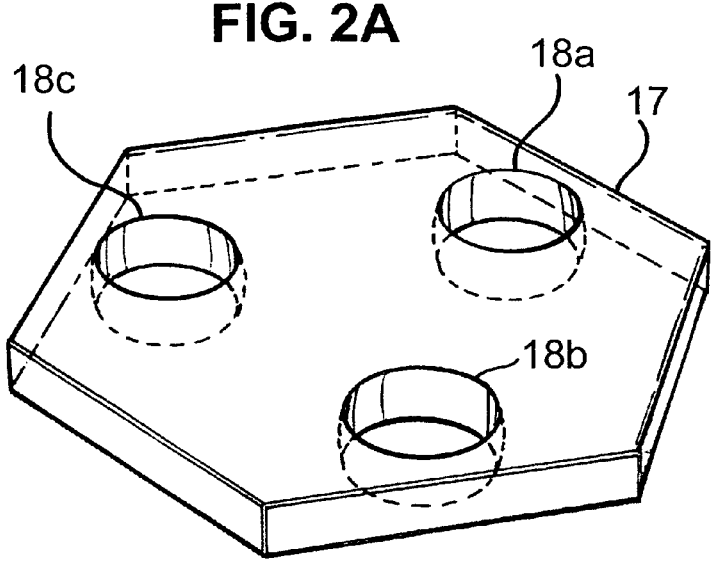
FIG. 2A is a top isometric view of a spacer constructed and arranged in accordance with the principle of the invention, the spacer having bores for maintaining balls.

Considering now preferred embodiments of the invention, reference is made to FIG. 2A, in which there is seen a spacer 17 for a kinematic mount. Spacer 17 has spherical bores 18a,18b,18c formed therethrough, which are arranged roughly in an equilateral triangular array. Bores 18a,18b,18c each receive therein for rotation a thrust bearing or ball. Spacer 17 is constructed of a substantially rigid material or combination of materials, such as steel, aluminum, titanium, plastic, etc. Spacer 17 can be integrally-formed, such as by molding or machining, or fashioned from a plurality of rigidly-affixed parts.

Figure 2B:
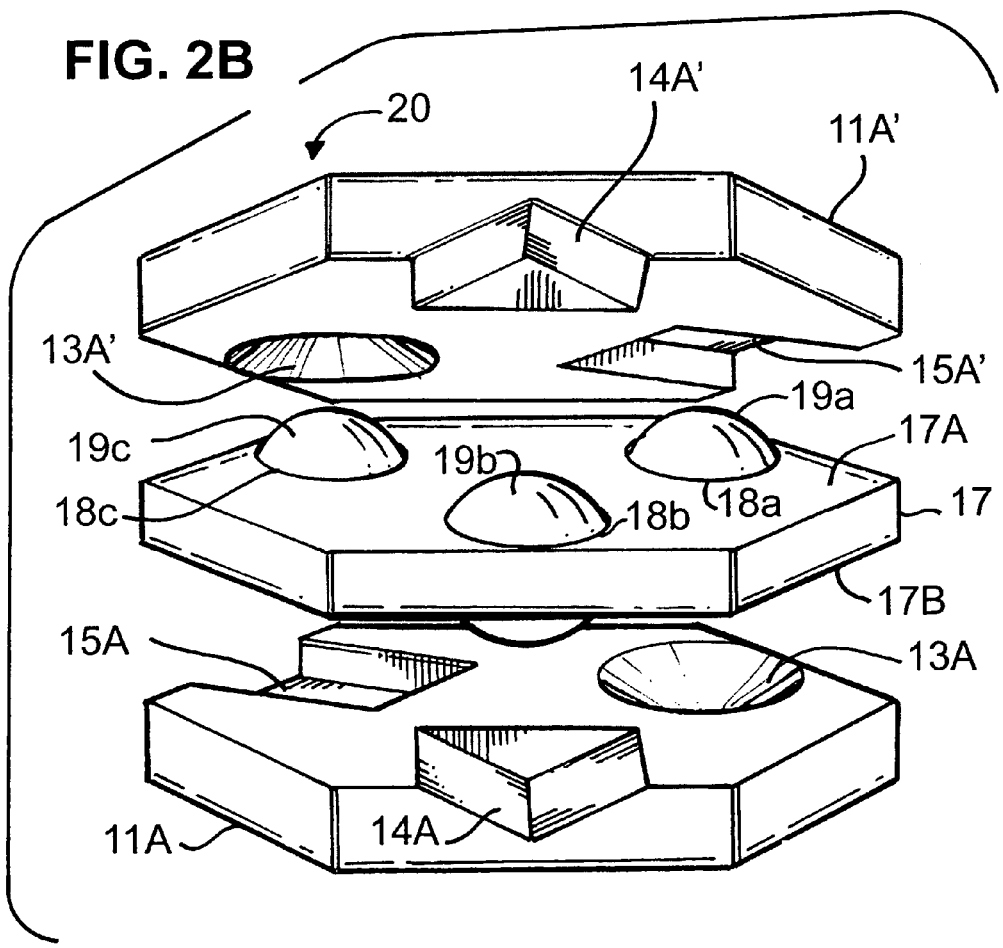
FIG. 2B is an isometric view of a kinematic mount constructed and arranged in accordance with the principle of the invention and shown as it would appear unlocked, the kinematic mount including opposing plates and the spacer of FIG. 2A maintaining balls disposed between the plates.
Figure 2B:
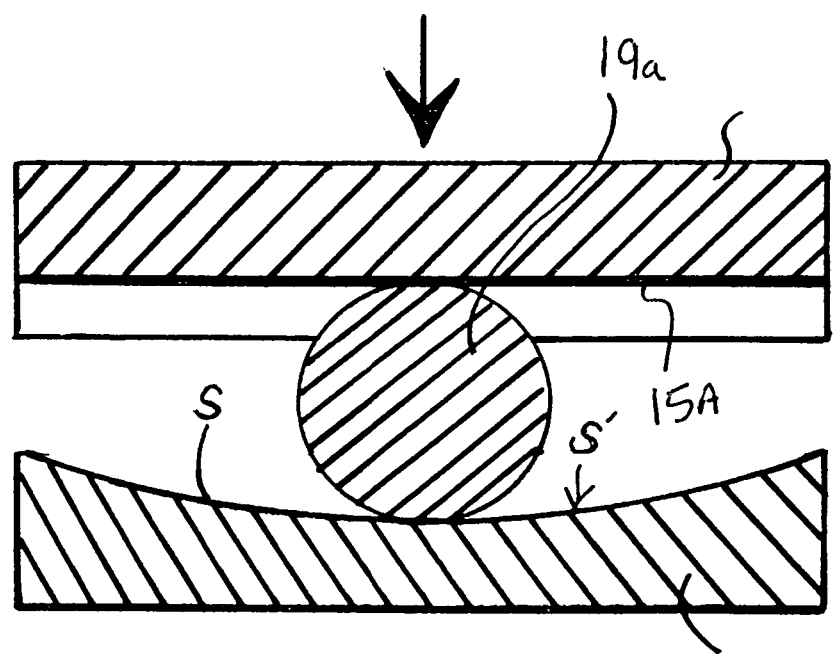
Figure 2C:
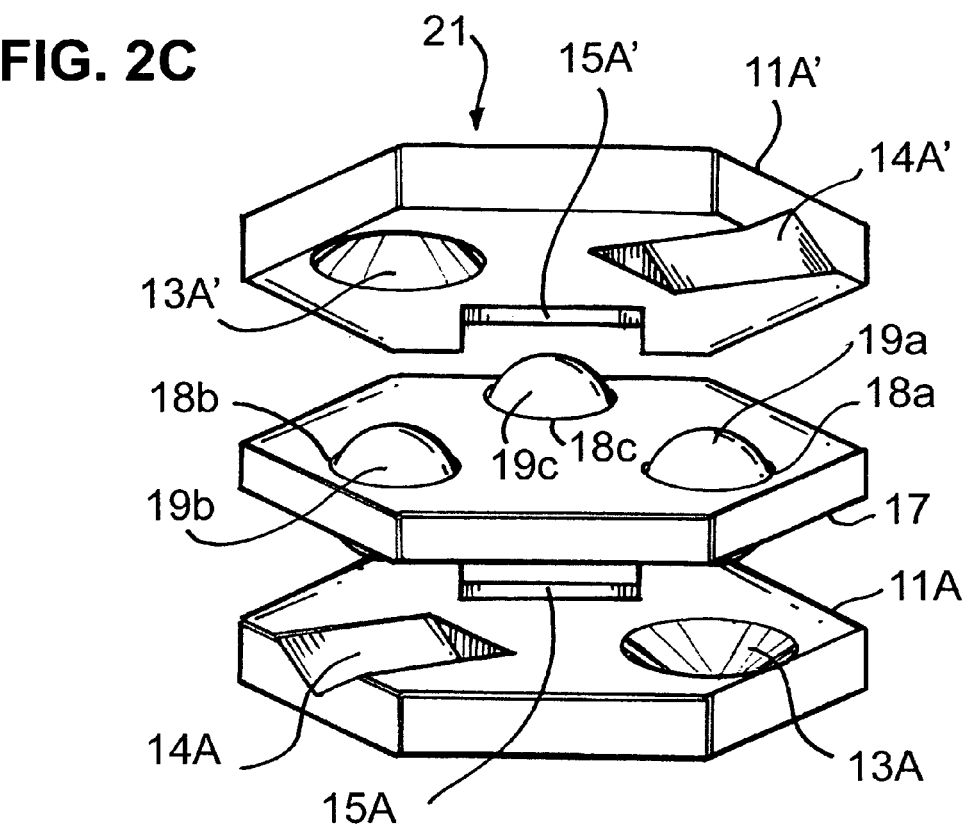
FIG. 2C is an alternate embodiment of a kinematic mount constructed and arranged in accordance with the principle of the invention and shown as it would appear unlocked.
Figure 2D:
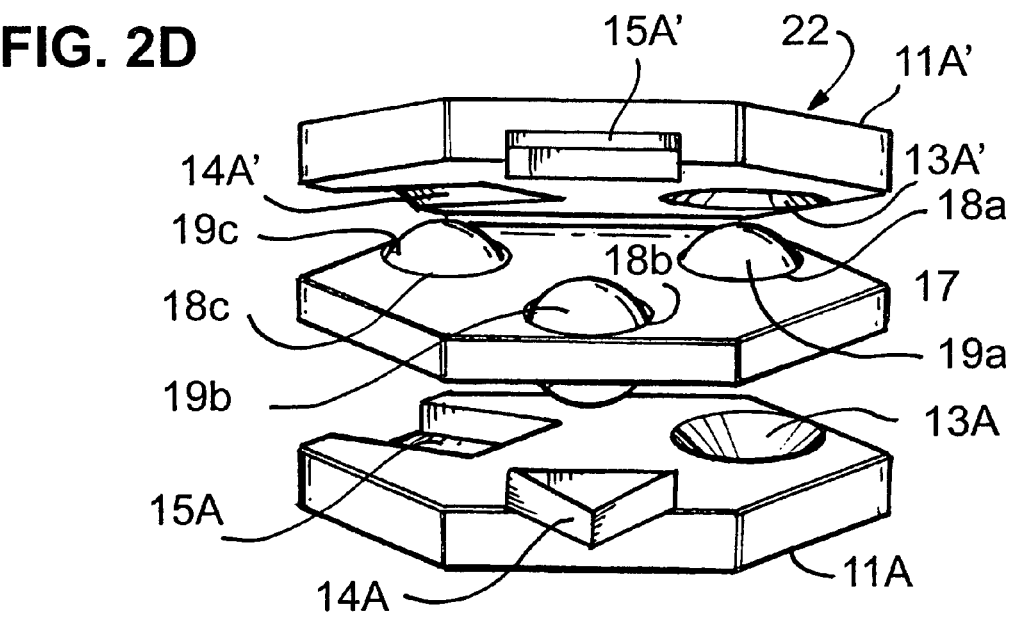
FIG. 2D is another alternate embodiment of a kinematic mount constructed and arranged in accordance with the principle of the invention and shown as it would appear unlocked.
Figure 2E:
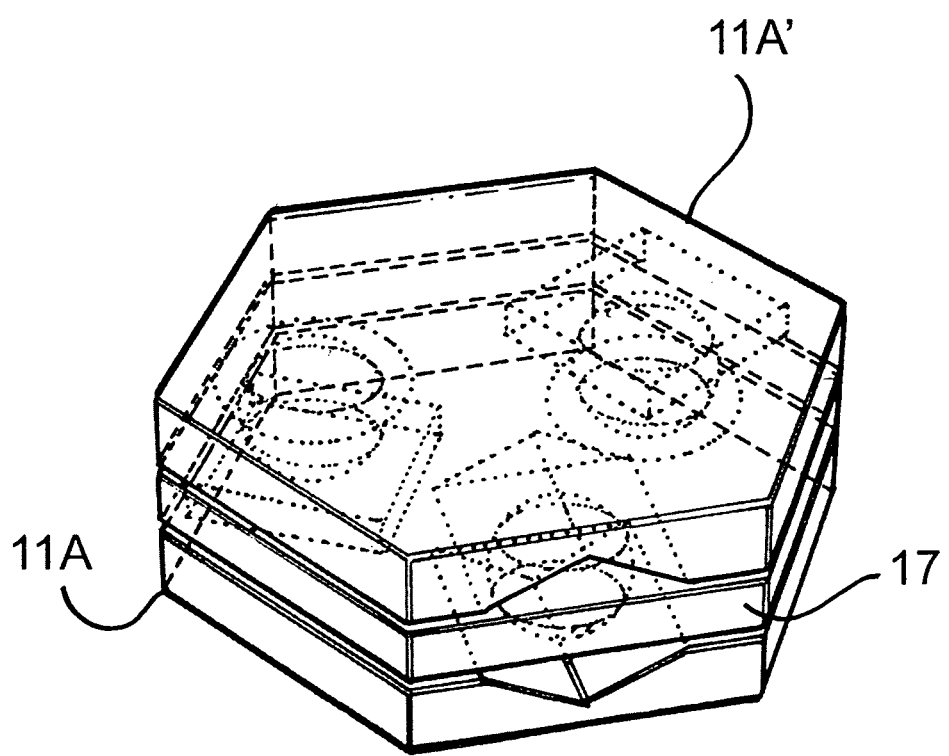
FIG. 2E is an isometric view of the kinematic mount of FIG. 2B shown as it would appear locked.

Turning to FIGS. 2B and 2E, illustrated is a kinematic mount 20 incorporating opposing rigid plates 11A and 11A', respectively. Plates 11A and 11A' are each identical to plate 11 previously discussed in conjunction with the prior art embodiment designated 10, and it is to be understood that the previous discussion of plate 11 applies to each of plates 11A and 11A'. Like plate 11, plates 11A and 11A' each include cavities 13,14,15, in which for clarity reference characters 13,14,15 in connection with plate 11A incorporate A designations, respectively, and reference characters 13,14,15 in connection with plate 11A' incorporate A' designations, respectively.

Positioned between plates 11A and 11A' is spacer 17 with balls 19a,19b,19c disposed in bores 18a,18b,18c, respectively. Spacer 17 maintains balls 19a,19b,19c in a roughly equilateral triangular array, and balls 19a,19b,19c are, in accordance with the principle of the invention, free to rotate in bores 18a,18b,18c, respectively, in which spacer 17 and balls 19a,19b,19c constitute a constrained free body subassembly. Spacer 17 has opposing major faces 17A and 17B, in which face 17A faces cavities 13A,14A,15A, and face 17B faces cavities 13A',14A',15A'. Balls 19a,19b,19c are not only free to rotate relative to bores 18a,18b,18c, they also project outboard of faces 17A and 17B. When balls 19a,19b,19c are disposed in bores 18a,18b,18c, respectively, balls 19a,19b, 19c are considered part of spacer 17.

Balls 19a,19b,19c are preferably equally-sized, as are bores 18a,18b,18c. Bores 18a,18b,18c are somewhat larger than balls 19a,19b,19c, respectively, which permits bores 18a,18b,18c to accept balls 19a,19b,19c, and which permits balls 19a,19b,19c to rotate relative to bores 18a,18b,18c.

Figure 2F:
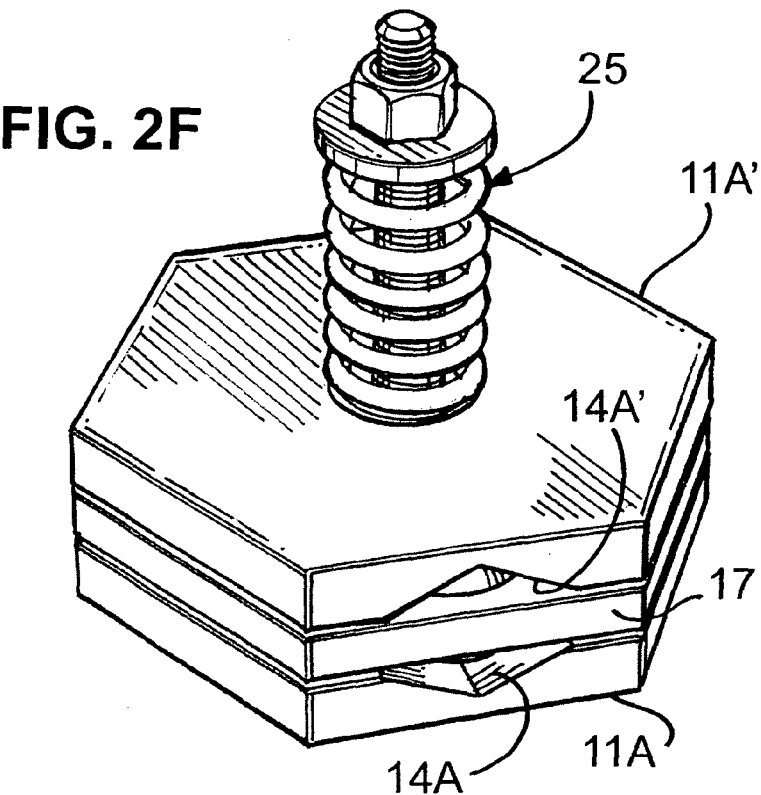
FIG. 2F is an isometric view of the kinematic mount of FIG. 2E as it would appear associated with a spring assisting in the locking of the kinematic mount.
Figure 2G:
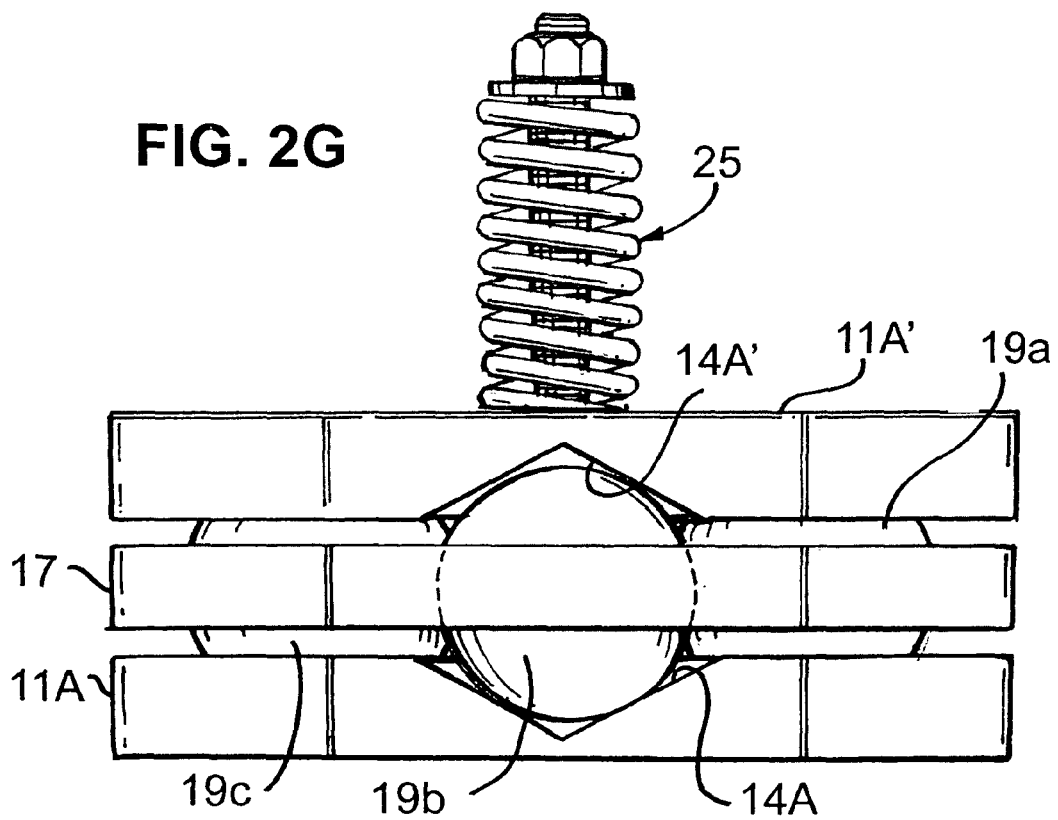
FIG. 2G is a side elevational view of the embodiment depicted in FIG. 2E.

FIG. 2B shows kinematic mount 20 as it would appear unlocked, and FIG. 2E shows kinematic mount 20 as it would appear locked. The separation between plates 11A,11A' and spacer 17 is exaggerated for the purpose of illustration. In the locked position in FIG. 2E, spacer 17, including balls 19a, 19b,19c, is sandwiched between plates 11A and 11A', in which balls 19a,19b,19c rest in cavities 13A,14A,15A, respectively, of plate 11A, and in cavities 15A',14A',13A', respectively, of plate 11A'. An acceleration field, such as gravity, ensures the locking of kinematic mount 20. Plates 11A and 11A' have parallel back surfaces, which are each perpendicular to the direction of the acceleration field. Plate 11A is typically fixed, and can be referred to as a base plate. Plate 11A' is presented against spacer 17 and spacer 17 is presented against plate 11 by the acceleration field. Typically a mass or object, which is not shown, is superimposed on plate 11A' and acts as payload on plate 11A'. The payload applied to plate 11A' can be augmented with an additional external influence, such as with a hydraulic assembly, a spring, etc. As an example of this, FIGS. 2F and 2G illustrate kinematic mount 20 as it would appear with a spring 25 applied to the back surface of plate 11A' applying an additional external locking force to kinematic mount 20. FIG. 2G is a side elevational view of kinematic mount 20 as it would appear with spring 25 applied to the back surface of plate 11A'. Those of ordinary skill in the art will readily appreciate that other devices may be used for augmenting the locking of kinematic mount 20.

Consistent with the discussion of plate 11 made in conjunction with the embodiment designated at 10, and with specific reference to FIG. 2B, cavities 13A,13A' are each conical (i.e., cones), cavities 14A,14A' are each crested (i.e., grooves), and cavities 15A,15A' are each flat (i.e., planes or recesses). When kinematic mount 20 is locked as in FIGS. 2E and 2F, the ball 19a touches the surface of cavity 13A at three points and the surface of cavity 15A' at one point, ball 19b touches cavity 14A at two points and the surface of cavity 14A' at two points, and ball 19c touches cavity 15A at one point and the surface of cavity 13A' at three points.

Cavity 13 can be formed as a triangular prism, a multiangular prism, or as a lofted surface rather than a cone, if desired. As a matter of example, FIG. 2B' shows ball 19a touching the surface of cavity 15A' at one point, and touching a lofted surface S of cavity S' at three points. In this respect, it is to be understood that cavity S', which is characterized by lofted surface S, may replace cavities 13A and 13A', if desired.

There are six contact points between balls 19a,19b,19c and plate 11A, and six contact points between balls 19a,19b,19c and plate 11A'. The three contact points between ball 19a and cavity 13A and the three contact points between ball 19c and cavity 13A' constrain motion of plates 11A and 11A', respectively, in the three X, Y, and Z translations. Ball 19a and cavity 13A, and ball 19c and cavity 13A', together constitute the primary constraint of kinematic mount 20. The two contact points between ball 19b and cavity 14A and the two contact points between ball 19b and cavity 14A', together constrain/retard motion of plates 11A and 11A', respectively, in $\theta_y$ (pitch) and $\theta_x$ (roll). Ball 19a and cavity 14A, and ball 19a and cavity 14A', together constitute the secondary constraint of kinematic mount 20. Finally, the single contact point between ball 19a and cavity 15A' and the single contact point between ball 19c and cavity 15A constrain motion of plates 11A and 11A', respectively, in $\theta_z$ (yaw). Ball 19a and cavity 15A', and ball 19c and cavity 15A, together constitute the tertiary constraint of kinematic mount 20.

Because balls 19a,19b,19c are not rigidly affixed, but are rather free to rotate relative to bores 18a,18b,18c, kinematic mount 20 is, in accordance with the principle of the invention, compliant. This compliance permits kinematic mount 20 to dynamically and automatically balance angular and magnitude disturbances in the acceleration field. During balancing events, the nature of the motion of kinematic mount 20 is mixed because the rotation of ball 19b between cavities 14A, 14A' is non-holonomic in nature (i.e., a reduced-friction rotation), and the rotation of balls 19a,19c is holonomic in nature (i.e., an increased-friction rotation). In other words, balls 19a,19c encounter more friction at their contact points when they rotate than does ball 19b. Friction at balls 19a,19c imparts damping to kinematic mount 20, and causes kinematic mount 20 to automatically re-center after balancing events, in accordance with the principle of the invention. Kinematic mount 20 is, therefore, a non-holonomic kinematic mount due to the non-holonomic nature of the rotation of balls 19a,19c.

The rotation of a ball of kinematic mount 20 is non-holonomic if the abutting surfaces of the opposing cavities of plates 11A,11A' it touches are parallel relative to one another. The axis of rotation of a ball extends through the ball between the two contact points between the ball and the opposing parallel surfaces. Thus, the non-holonomic characteristic of a ball of kinematic mount 20, namely, the unconditional, reduced-friction rotation of a ball of kinematic mount 20, is ensured only if the surfaces of the cavities of plates 11A,11A' the ball touches are parallel relative to one another. Moreover, the holonomic characteristic of a ball of kinematic mount 20, namely, the conditional, increased-friction rotation of a ball of kinematic mount 20, is ensured only if the surfaces of the cavities of plates 11A,11A' it touches are not parallel to one another. Unconditional, reduced-friction rotation of ball 19b of kinematic mount 20 is achieved because the surfaces of cavity 14A it touches are parallel to the surfaces of cavity 14A' it touches.

Unconditional, increased-friction rotation of a ball of a kinematic mount constructed and arranged in accordance with the principle of the invention is achieved by orienting plates 11A,11A' and positioning a ball between opposing cavities 14A,14A' as in kinematic mount 20. Unconditional, increased-friction of a ball of a kinematic mount constructed and arranged in accordance with the principle of the invention is also achieved by orienting plates 11A,11A' and positioning a ball between opposing cavities 15A,15A' as in the embodiment of kinematic mount 21 in FIG. 2C. It is to be understood that plates 11A,11A' can each incorporate various combinations of cavities for providing non-holonomic ball rotations, and a selected number holonomic ball rotations.

Referring specifically to FIG. 2C, kinematic mount 21 includes plates 11A,11A', and spacer 17 maintaining balls 19a,19b,19c. In this embodiment designated 21, plates 11A, 11A' are orientated relative to spacer 17 such that when kinematic mount 21 is locked the surface of ball 19a touches the surface of cavity 13A at three points and the surface of cavity 14A' at two points, the surface of ball 19b touches cavity 14A at two points and the surface of cavity 13A' at three points, and the surface of ball 19c touches cavity 15A at one point and the surface of cavity 15A' at one point.

And so in the embodiment of the kinematic mount designated at 21 there are six contact points between balls 19a,19b, 19c and plate 11A, and six contact points between balls 19a,19b,19c and plate 11A'. The three contact points between ball 19a and cavity 13A and the three contact points between ball 19c and cavity 13A' constrain motion of plates 11A and 11A' in the three X, Y, and Z translations, respectively. Thus, ball 19a and cavity 13A, and ball 19c and cavity 13A', together constitute the primary constraint of kinematic mount 21. The two contact points between ball 19b and cavity 14A and the two contact points between ball 19a and cavity 14A' together constrain motion of plates 11A and 11A', respectively, in $\theta_y$ (pitch) and $\theta_x$ (roll). Ball 19b and cavity 14A, and ball 19a and cavity 14A', together constitute the secondary constraint of kinematic mount 21. Finally, the single contact point between ball 19c and cavity 15A' and the single contact point between ball 19c and cavity 15A constrain motion of plates 11A and 11A', respectively, in $\theta_z$ (yaw). Ball 19c and cavity 15A', and ball 19c and cavity 15A, together constitute the tertiary constraint of kinematic mount 20. Because balls 19a,19b,19c are not rigidly affixed, but are rather free to rotate relative to bores 18a,18b,18c, kinematic mount 21 is compliant and is able to dynamically and automatically balance angular and magnitude disturbances in the acceleration field. The surfaces of cavities 15A,15A' ball 19c touches are parallel to one another. As such, rotation of ball 19c is non-holonomic in nature. Kinematic mount 21 is, therefore, a non-holonomic kinematic mount.

Regarding FIG. 2D, a kinematic mount 22, which is constructed and arranged in accordance with the principle of the invention, includes plates 11A,11A', and spacer 17 including balls 19a,19b,19c. In this embodiment designated at 22, plates 11A,11A' are orientated relative to spacer 17 such that when kinematic mount 21 is locked the surface of ball 19a touches the surface of cavity 13A at three points and the surface of cavity 13A' at three points, the surface of ball 19b touches cavity 14A at two points and the surface of cavity 15A' at one point, and the surface of ball 19c touches cavity 15A at one point and the surface of cavity 14A' at two points.

And so in the embodiment of the kinematic mount designated at 22 there are six contact points between balls 19a,19b, 19c and plate 11A, and six contact points between balls 19a,19b,19c and plate 11A'. The three contact points between ball 19a and cavity 13A and the three contact points between ball 19a and cavity 13A' constrain motion of plates 11A and 11A', respectively, in the three X, Y, and Z translations. Thus, ball 19a and cavity 13A, and ball 19a and cavity 13A', together constitute the primary constraint of kinematic mount 22. The two contact points between ball 19b and cavity 14A and the two contact points between ball 19c and cavity 14A' together constrain motion of plates 11A and 11A', respectively, in $\theta_y$ (pitch) and $\theta_x$ (roll). Ball 19b and cavity 14A, and ball 19c and cavity 14A', constitute the secondary constraint of kinematic mount 22. Finally, the single contact point between ball 19b and cavity 15A' and the single contact point between ball 19c and cavity 15A constrain motion of plates 11A and 11A', respectively, in $\theta_z$ (yaw). Ball 19b and cavity 15A', and ball 19c and cavity 15A, together constitute the tertiary constraint of kinematic mount 22. Because balls 19a, 19b,19c are not rigidly affixed, but are rather free to rotate relative to bores 18a,18b,18c, kinematic mount 22 is compliant and is able to dynamically and automatically balance angular and magnitude disturbances in the acceleration field. None of the surfaces of the cavities of plates 11A,11A' balls 19a,19b,19c touch are parallel to one another. Accordingly, the rotations of balls 19a,19b,19c are non-holonomic in nature. Kinematic mount 22 is, therefore, a non-holonomic kinematic mount.

Having described exemplary embodiments if kinematic mounts designated at 20, 21, and 22, attention is now directed to FIG. 3A, which illustrates a contact condition designated at 30 including a ball 31 in contact with a surface or flat 32, in accordance with the principle of the invention. Contact condition 30 may be used for one or more surface contact points between one or more of the balls and cavities of the preferred embodiments of kinematic mounts disclosed herein, including kinematic mounts 20,21,22 of the invention as previously disclosed and ensuing preferred embodiments. In the representation depicted in FIG. 3A, a forcible impulse is applied to ball 31 directing ball 31 against flat 32 so as to cause ball 31 to create an indent or footprint 34 in flat 32, which can also be seen in top plan view in FIG. 3A'. In this example, ball 31 is more rigid than flat 32, which causes footprint 34 to form in surface 32 in response to a forcible impulse applied to ball 31 against flat 32.

Preferably, flat 32 is elastic, in which upon release of ball 31 from flat 32 footprint 34 will recover and flat 32 will take on its original shape. If flat 32 was not elastic, footprint 34 will remain. Contact condition 30 is a compliant contact condition, and introduction of contact condition 30 into a kinematic mount (kinematic mount 20, 21, or 22) provides an additional layer of compliance and further improves balancing events. Although flat 32 is more rigid than ball 31, this can be reversed in an alternate embodiment of contact condition 30. In the case in which ball 31 is less rigid than flat 32, an indentation would form in the ball 31 surface, rather than flat 32. In this respect, ball 31 can be formed of an elastomer material, or a plurality of elastomer materials, in which case flat 32 is made of a material that is more rigid than ball 31, such as steel, aluminum, etc.

In FIG. 3B illustrated is another contact condition designated at 40 including ball 31 in contact with flat 32, in accordance with the principle of the invention. Contact condition 40 may be used for one or more surface contact points between one or more of the balls and cavities of the preferred embodiments of kinematic mounts disclosed herein, including kinematic mounts 20,21,22 of the invention as previously disclosed and ensuing preferred embodiments. In the representation depicted in FIG. 3B, ball 31 is moving across flat 32 in the direction indicated by the arrowed line A and a forcible impulse is concurrently applied to ball 31 directing ball 31 against flat 32 so as to cause ball 31 to create an indented track 39 into flat 32, which can also be seen in top plan view in FIG. 3B'. As seen in FIG. 3B', track 39 includes a head contour 35, an opposing tapered tail 38, and opposing parallel sides 37 therebetween. Head contour 35 is a front half of a dynamic, or instantaneous, indentation footprint 36, which is elliptical. Track 39 is in an un-recovered state, in which tail 38 is in the process of recovering. In the case in which flat 32 is elastic, which is preferred, the tracking in FIG. 3B will recover. In this example, ball 31 is more rigid than flat 32, which causes track 39 to form in flat 32 in response to a forcible impulse applied to ball 31 against flat 32 as it moves thereacross. Flat 32 is elastic in the preferred embodiment, in which track 39 will recover after ball released from flat 32, and flat 32 will take on its original shape. If flat 32 is not elastic, track 39 will remain. Furthermore, if flat 32 is made of materials having any plasticity characteristics, track 39 will remain in flat 32. Permanent tracking is desirable for kinematic mounts used for seismic and blast protection, but not for precision positioning in semiconductor industry or in optics.

Figure 3C:
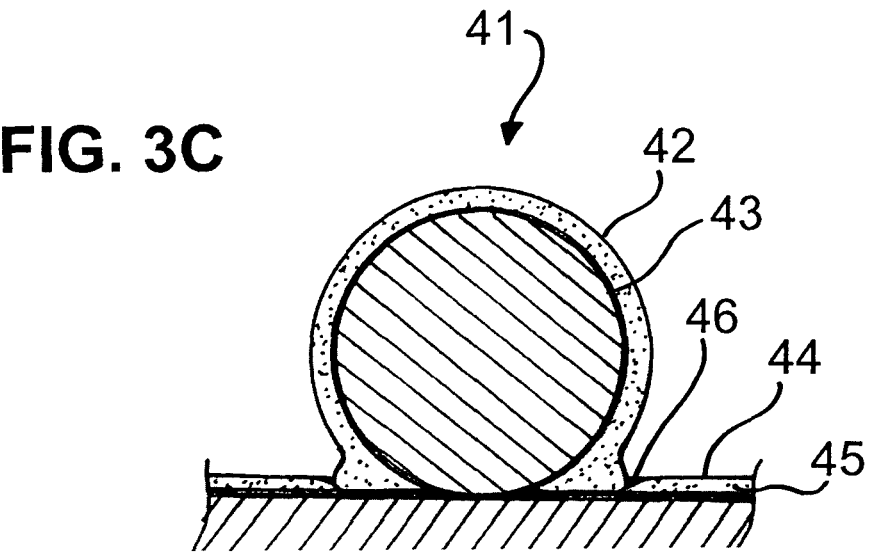
FIG. 3C is a vertical sectional view of another contact condition including a ball, coated with an elastomer, in contact with a flat, coated with an elastomer, in accordance with the principle of the invention.

Referring now to FIG. 3C, yet another contact condition 41 is shown, which includes a rigid ball 43 and a rigid surface or flat 45, in accordance with the principle of the invention. Contact condition 41 may be used for one or more surface contact points between one or more of the balls and cavities of the preferred embodiments of kinematic mounts disclosed herein, including kinematic mounts 20,21,22 of the invention as previously disclosed and ensuing preferred embodiments. In this embodiment, an elastomer is applied to ball 43 in the form of a shell/layer 42, and flat 45 is also coated with an elastomer material in the form of a layer 44. Layers 42 and 44 are each applied by spraying, spreading, or other conventional coating technique. In the representation depicted in FIG. 3C, a forcible impulse is applied to ball 42 directing ball 42 against flat 45 so as to cause ball 43 to create an indent or footprint 46 in flat 45, and, more particularly, in elastomer layer 44. The deformation of elastomer layers 42 and 44 is exaggerated in FIG. 3C for illustrative purposes. Because flat 45 is coated with elastomer layer 44, footprint 46, and any deformation in elastomer layer 42, will fully recover upon removal of ball 43 from flat 45. The provision of elastomer layer 42 on ball 43 and elastomer layer 44 on flat 45 introduce compliance in the contact between ball 43 and flat 45. Contact condition 41 is a compliant contact condition, and introduction of contact condition 41 into a kinematic mount (kinematic mount 20, 21, or 22) provides an additional layer of compliance and further improves balancing events.

Figure 3D:
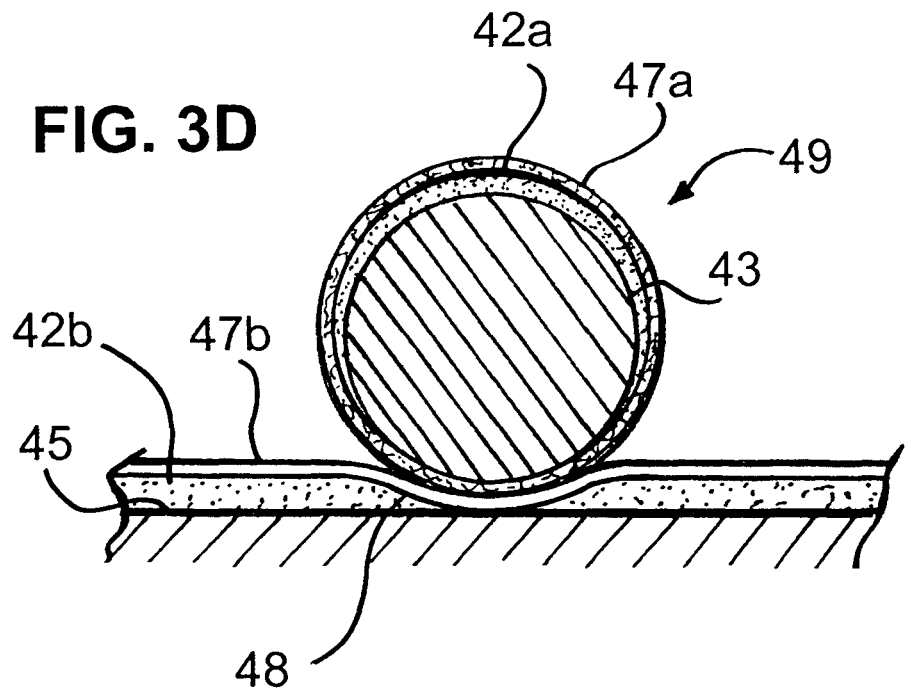
FIG. 3D is a vertical sectional view of a contact condition including a ball, coated with an elastomer and plated with an elastoplastic shell, in contact with plating applied onto an elastomer coating on a flat, in accordance with the principle of the invention.

In accordance with the principle of the invention, FIG. 3D illustrates still yet another improved contact condition designated at 49 may be used for one or more surface contact points between one or more of the balls and cavities of the preferred embodiments of kinematic mounts disclosed herein, including kinematic mounts 20,21,22 of the invention as previously disclosed and ensuing preferred embodiments. The contact condition 49 in FIG. 3D is characterized by a rigid ball 43 coated with two discrete materials, one atop the other, namely, an elastomer material in the form of a shell/layer 42a coating ball 43 and an elastoplastic material in the form of a shell/layer 47a coating elastomer shell/layer 42a. An elastomer in the form of a layer 42b is applied to flat 45, and an elastoplastic material in the form of a layer 47b is applied to elastomer layer 42b. Ball 43 is directed against flat 45, in which elastoplastic layer 47a is in contact with elastoplastic layer 47b. Flat 45 is rigid in this embodiment. In the representation depicted in FIG. 3D, a forcible impulse is applied to ball 43 directing ball 43 against flat 45 forming a small footprint 48. Footprint 48 is a deformation formed in elastoplastic layer 47B and elastomer layer 42b. It is to be understood that elastoplastic layer 47a and elastoplastic layer 47b distribute the contact stresses of elastomer layer 42a and elastomer layer 42b, respectfully, providing compliance. If desired, one of elastoplastic layers 47a and 47b can be eliminated, if desired. Contact condition 49 is useful in kinematic mounts employed in positioning table applications, manipulator base applications, and other similar applications. Contact condition 49 is a compliant contact condition, and introduction of contact condition 49 into a kinematic mount (kinematic mount 20, 21, or 22) provides an additional layer of compliance and further improves balancing events.

Figure 4:
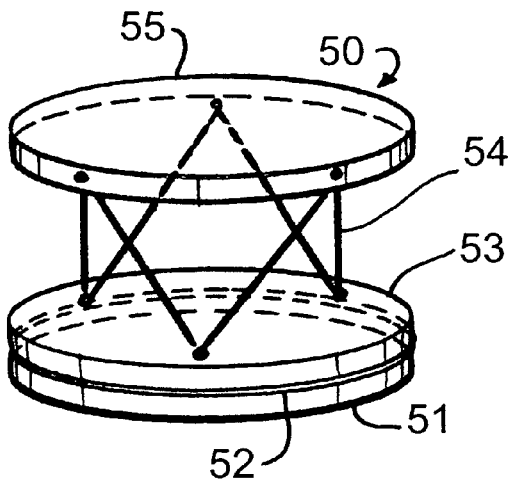
FIG. 4 is a partially schematic isometric view of a positioning platform incorporating kinematic mounts constructed and arranged in accordance with the principle of the invention.

As a matter of example of an application of the kinematic mounts of the invention, reference is now made to FIG. 4, in which there is seen a positioning platform assembly 50 incorporating a base structure 51, a manipulator base 53 overlying base structure 51, a payload base 55 opposing manipulator base 53, manipulator arms 54, and a mount space 52 between base structure 51 and manipulator base 53. In this example, base structure 51 incorporates three kinematic mounts disposed at a space 52 between base structure 51 and manipulator base 53, each constructed and arrange in accordance with the invention (i.e., kinematic mounts 20,21,22), for supporting manipulator base 53. Manipulator arms 54 position payload base 55 and the top surface of payload base 55 is perpendicular to an acceleration field, such as gravity. Kinematic mounts constructed and arranged in accordance with the principle of the invention in space 52 reduce control demand of arms 54 when the acceleration field is disturbed. This reduction in control demand is highly desirable in anchored sea-based rigs, large seagoing ships, large ground-based antennas, telescopes, lenses, mirrors and laser weaponry, which need to be protected from seismic and terrorist induced blast events. Although the kinematic mounts of the invention have wide application in heavy load applications, such as large equipment applications, they may be used in small light load applications, such as scientific and educational equipment, semiconductor applications, and other light load applications.

Figure 5A:
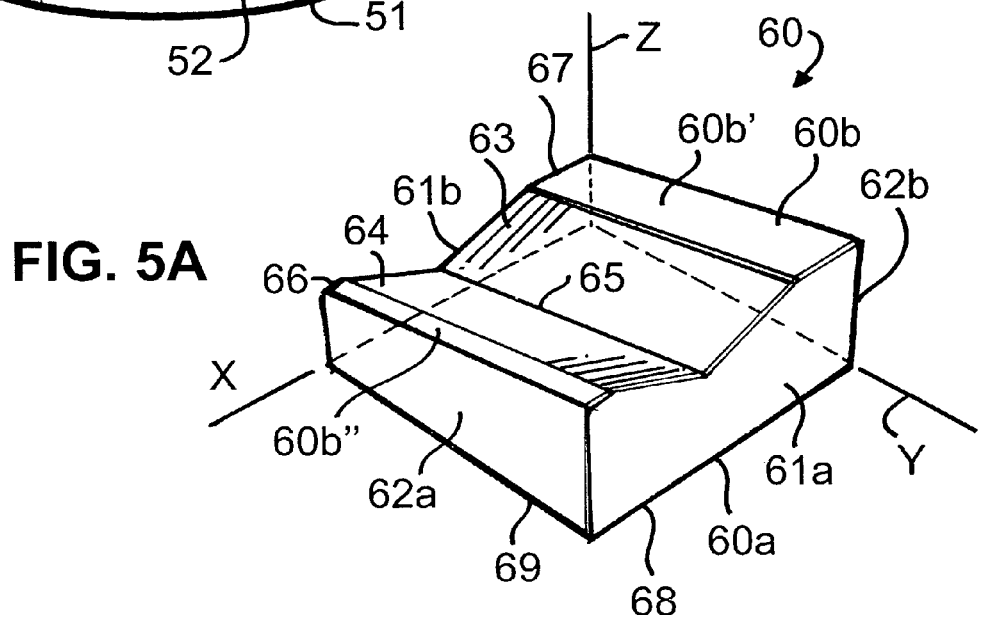
FIG. 5A is an isometric view of a building block for use in constructing plates for kinematic mounts, in accordance with the principle of the invention.

In accordance with the principle of the invention, the plates of the kinematic mounts constructed and arranged in accordance with the principle of the invention can be made as assemblies of building blocks. FIG. 5a illustrates an exemplary embodiment of just such a building block, which is designated generally at 60. Depending on specific applications and needs, block 60 can be elastic, elastoplastic, or rigid. Block 60 can be integrally formed, or fashioned as an assembly of two or more rigidly-affixed parts, and this applies not only to block 60 but also to all ensuing preferred building block embodiments.

Block 60 is a discrete, modular unit, and has non-mating surfaces, namely, opposing parallel surfaces 61a and 61b, and opposing parallel surfaces 62a and 62b. Surfaces 61a and 61b characterize the opposing ends of block 60, and surfaces 62a and 62b characterize the opposing sides of block 60. Block 60 also has opposing major faces 60a and 60b. Surfaces 61a and 61b, which reside in opposing parallel X-Z planes, can be considered end surfaces of block 60, and surfaces 62a and 62b, which reside in opposing parallel Y-Z planes, can be considered side surfaces of block 60. Surface 60a can be fixed, or arranged to receive a payload. Axis Z of block 60 is to be aligned with the acceleration field when it is employed in a plate of a kinematic mount. A groove/cone is formed into surface 60b, which is characterized by opposing, inwardly directed surfaces 63 and 64 that meet at a groove line 65, which is perpendicular to axis X and slanted downwardly relative to the X-Y plane from surface 61a to surface 61b.

Opposing surfaces 60b' and 60b" on either side of the groove reside in the same plane, which, like groove line 65, is similarly slanted relative to the X-Y plane. Moreover, block 60 tapers from surface 61a to surface 61b. In this regard, the end of block 60 at surface 61B can be considered the tapered end of block 60. The size of block 60 is generally defined by edge 68 length and edge 69 length in the X and Y coordinates, respectively. The length of edges 68 and 69 need not necessarily be equal a shown. The groove of building block 60 can be provided with an elastomer layer as discussed above in conjunction with the contact condition of FIG. 3C, or with an elastomer layer and an elastoplastic layer as discussed above in conjunction with the contact condition set forth in FIG. 3D.

Figure 5B:
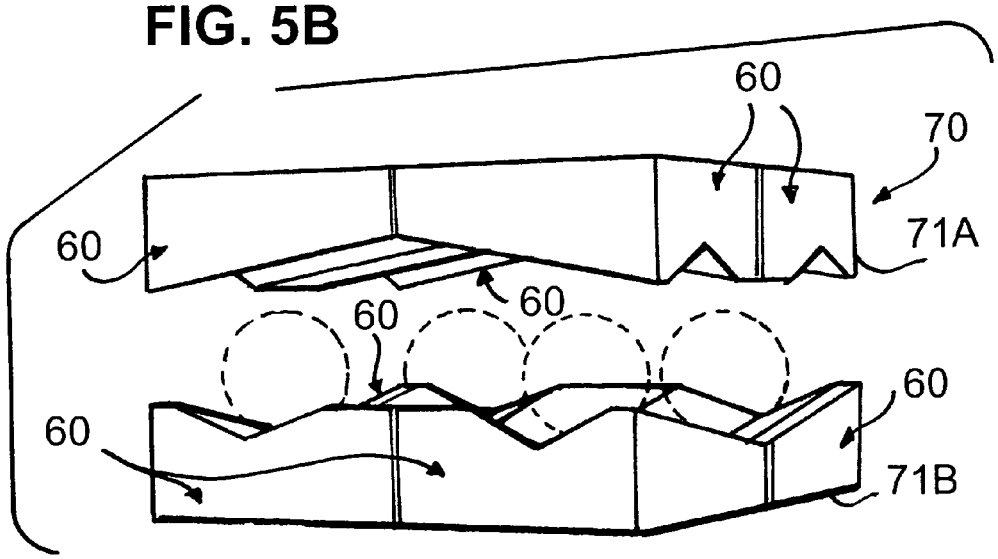
FIG. 5B is an isometric view of opposing plates for a kinematic mount each constructed from building blocks constructed and arranged in accordance with the building block depicted in FIG. 5A, with balls depicted in phantom outline for illustrative purposes.
Figure 5C:
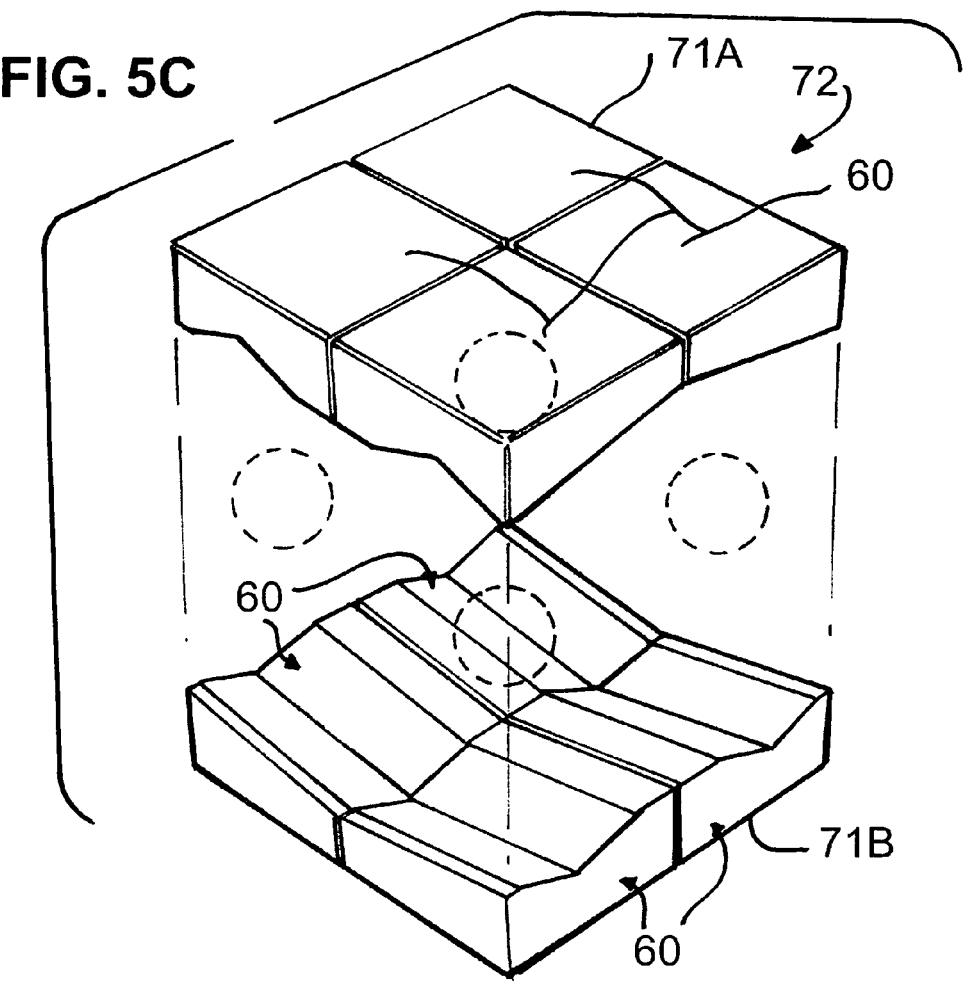
FIG. 5C is another isometric view of the plates of FIG. 5B with balls depicted in phantom outline for illustrative purposes.

FIGS. 5B and 5C illustrates a kinematic mount plate subassembly including opposing plates 71A and 71B each fashioned from blocks 60. Plate 71A is fashioned from four blocks 60 including opposing pairs of blocks 60. Blocks 60 of each pair of blocks 60 are arranged side-by-side, and the opposing pairs of blocks 60 are further disposed tapered ends to tapered ends, as illustrated, such that the opposing pairs of blocks are each a mirror image of one another. Blocks 60 of plate 71A are rigidly affixed together, such as by welding or gluing. Because plate 71A incorporates four blocks 60, plate 71A has four grooves, in which each groove provides two contact points for a ball.

Plate 71B is also fashioned from four blocks 60 including opposing pairs of blocks 60. With respect to plate 71B, blocks 60 of each pair of blocks 60 are arranged side-by-side, and the opposing pairs of blocks 60 are further disposed tapered ends to tapered ends, as illustrated, such that the opposing pairs of blocks are each a mirror image of one another. Blocks 60 of plate 71B are rigidly affixed together, such as by welding or gluing. Because plate 71B incorporates four blocks 60, plate 71B has four grooves, in which each groove provides two contact points for a ball.

Although four blocks 60 are used in the construction of plate 71A, less or more can be used. Also, although four blocks 60 are used in the construction of plate 71B, less or more can be used.

In the arrangement depicted in FIGS. 5B and 5C, in the X-Y plane the grooves of plate 71A are perpendicular relative to the grooves of plate 71B. In FIGS. 5B and 5C, plate 71A is a top plate and plate 71B is a bottom plate.

Figure 5D:
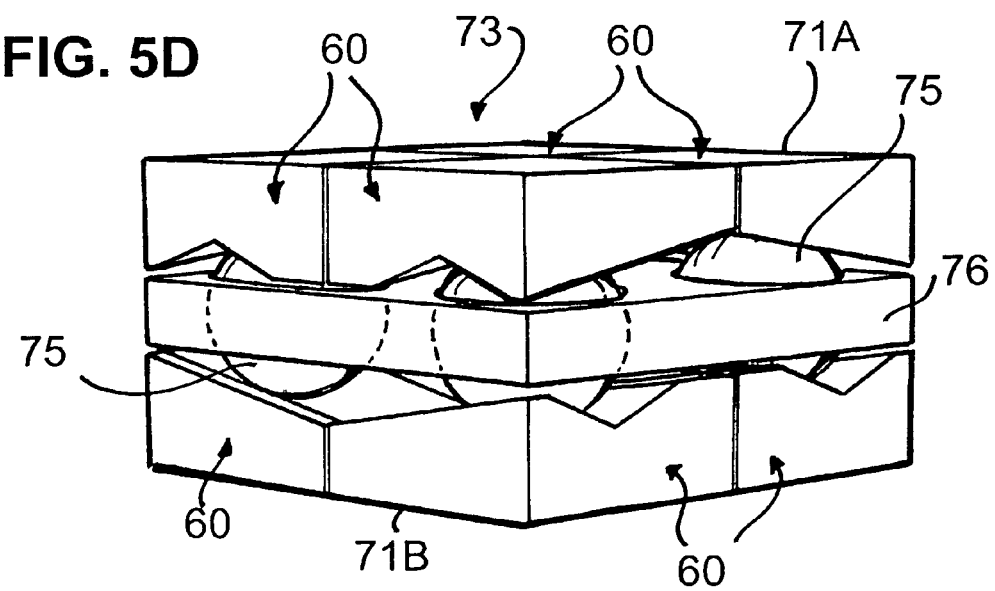
FIG. 5D is an isometric view of a kinematic mount shown as it would appear locked and including the opposing plates of FIG. 5C and a spacer disposed therebetween incorporating four balls, in accordance with the principle of the invention.
Figure 5E:
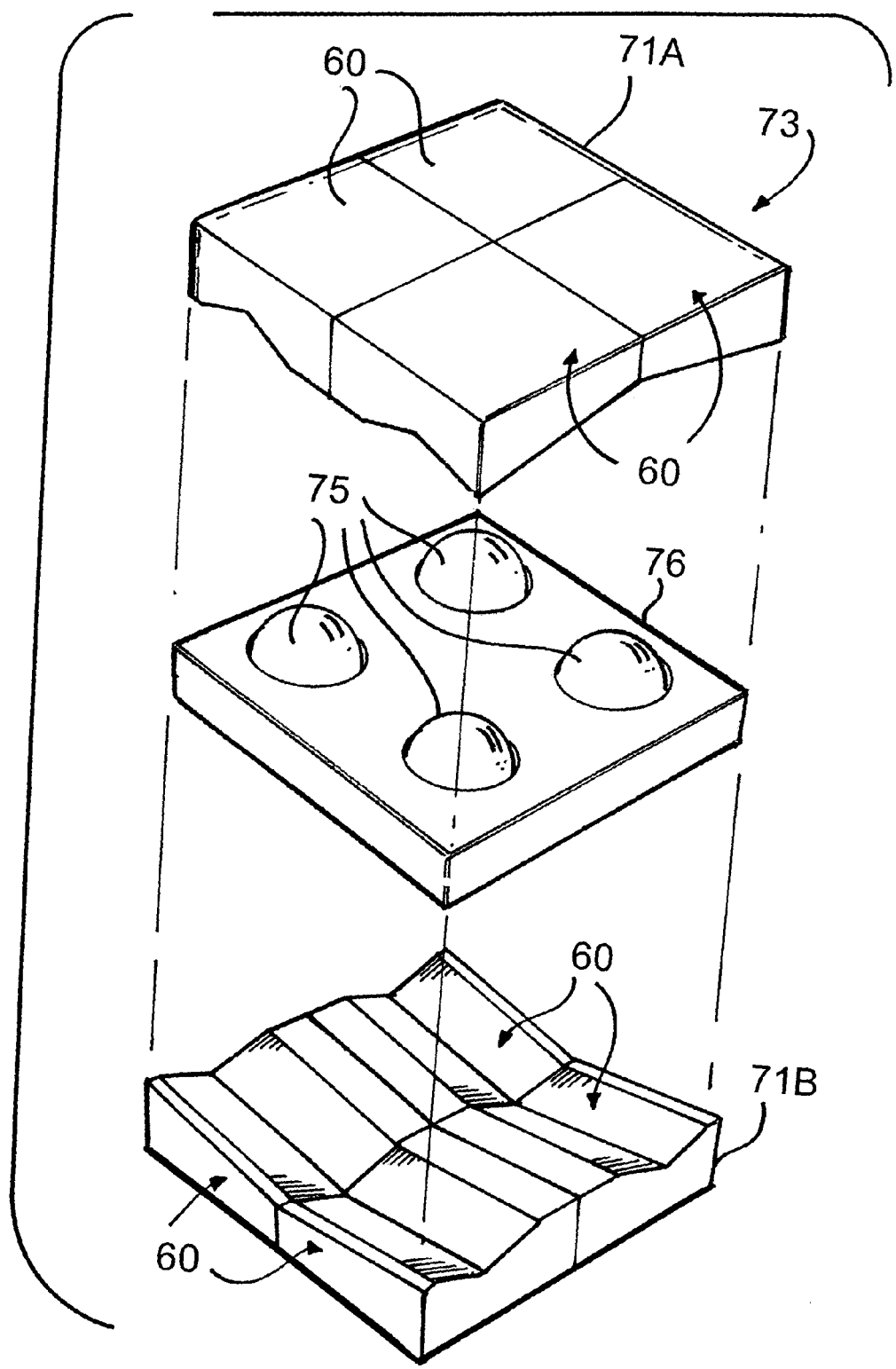
FIG. 5E is a partially exploded isometric view of the kinematic mount of FIG. 5D.

FIGS. 5D and 5E illustrates a kinematic mount 73, including top plate 71A, bottom plate 71B, four balls 75 and a spacer 76, which has spherical bores to keep the distances between balls 75 constant but to allow for ball rotation in the bores and for ball roll on the grooves. In FIG. 5D, each ball 75 is held by, and contacts, two opposing grooves of plates 71A, 71B, respectively. With the exception of four balls 75 and four corresponding bores provided by spacer 76, spacer 76 and balls 75 are identical to spacer 17 and balls 19a,19b,19c as previously discussed, and it will be understood that the discussion of spacer 17 and balls 19a,19b,19c applies to spacer 76 and balls 75.

In FIG. 5D, each ball 75 is held by, and contacts, two opposing grooves of plates 71A, 71B, respectively. Because each groove of plate 71A provides two ball contact points, and because each groove of plate 71B provides two ball contact points, balls 75 provide eight contact points with plate 71A and eight contact points with plate 71B. Because only six contact points for each plate is sufficient to constrain the movement of plates along the three translations and the three rotations, the two additional contact points for each plate 71A, 71B, are redundant. However, this is in accordance with the principle of the invention because it is to be understood that at least one contact point between one of the balls and a corresponding contact surface of one of the plates is compliant, and incorporates one of the compliant contact conditions set forth in FIGS. 3C and 3D, namely, compliant contact condition 41 or compliant contact condition 42. Compliance in kinematic mount 73 is not only by the provision of ball rotation, but also at one of balls 75, such that the remaining six contact points for each plate remain essentially kinematic. Although only one contact point is needed between a ball and a plate to provide the required compliance in accordance with a preferred embodiment, more can be provided, if desired.

As intimated before in conjunction with spacer 17, spacer 76 and balls 75 makes up a constrained free body subassembly. After the acceleration field disturbance is over, kinematic mount 73 re-centers due not only to the slant of the grooves of plates 71A, 71B, but also because of the compliance introduced at one of balls 75 and the rotation of the balls.

Spacer 75 can be eliminated in kinematic mount 73, if desired. Although spacer 75 may seem redundant in kinematic mount 73, its presence increases the dynamic nature of kinematic mount 73 and provides enhanced robustness.

Figure 6A:
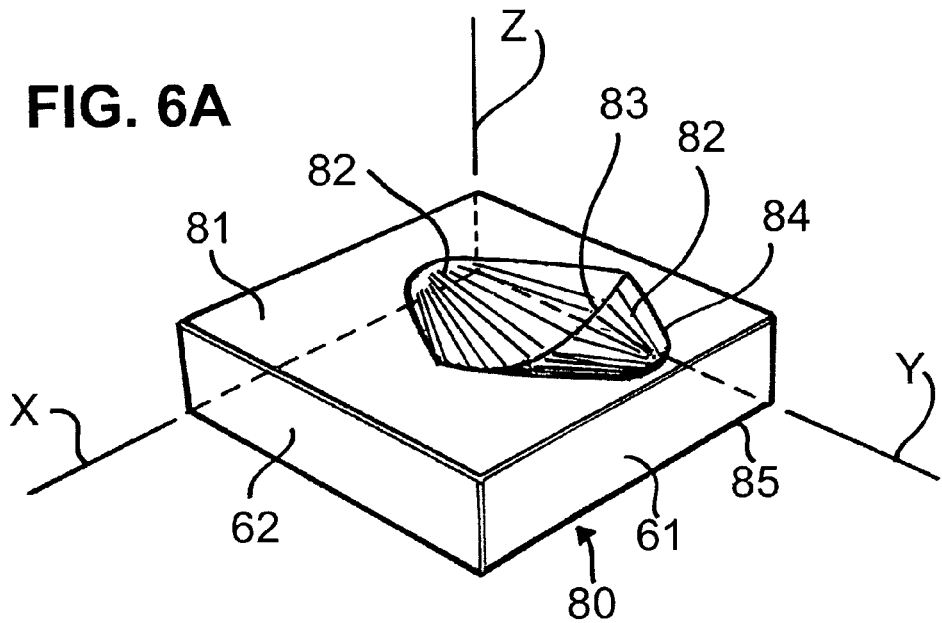
FIG. 6A is an isometric view of an alternate embodiment of a building block for use in constructing plates for kinematic mounts, in accordance with the principle of the invention.

FIG. 6A illustrates another embodiment of a building block 80 used to fashion plates of kinematic mounts, in accordance with the principle of the invention. Block 80 is similar in function to block 60, and is joined with other similar blocks to form plates as described in conjunction with block 60, but does incorporate different geometry, which alters motion characteristics. Briefly considering block 80, faces 61 and 62 are non-mating, and the X, Y, and Z coordinate system is basically the same as block 60, in which axis Z defines the acceleration field. Top surface 81 of block 80 has a surface cavity, which provides two contact points for a ball. With continuing reference to FIG. 6A and additional reference to FIG. 6A', the cavity is characterized by two, opposing conical surfaces 82 that meet each other in circular groove line 83 and that meet surface 81 in two parabolic edge lines 84. Block 80 size is generally defined by edge line 85. With specific reference to FIG. 6A', the axis of rotation of a ball in cavity is counter aligned (i.e., perpendicular within large tolerances of within +/−50°) with the acceleration filed as defined along axis Z. In FIG. 6A', a ball is depicted in phantom outline for illustrative purposes only.

It is to be noted that the axis of conical surfaces 82 is parallel to plane X-Y, and thus perpendicular to the acceleration field. This is in contrast to a cone orientation. In this regard, while non-holonomic ball or reduced-friction ball rolling can take place on cone surfaces along the axis aligned with the acceleration field in only two rotational directions (radial and tangential relative to the direction of the acceleration field), such motion occurs anywhere on conical surfaces 82 thus providing enhanced realignment characteristics. Also, while cone 13 (previously discussed) touches a ball at three points, a ball can touch conical surfaces 82 at only two points.

Figure 6B:
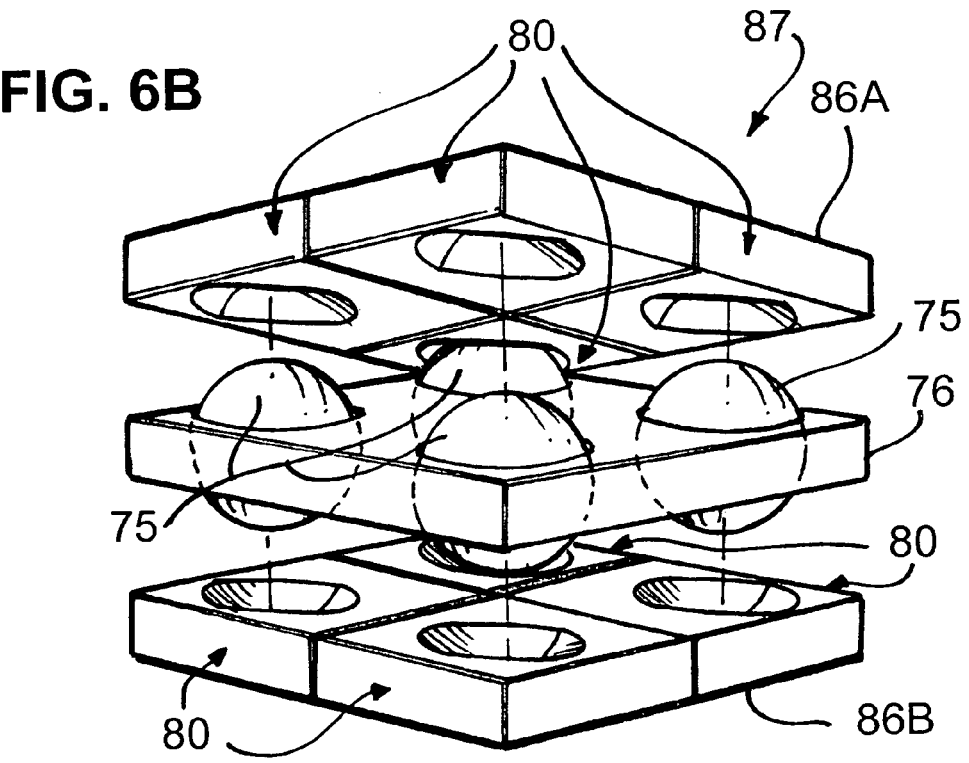
FIG. 6B is an isometric view of a kinematic mount shown as it would appear unlocked and including opposing plates each fashioned as an assembly of the building blocks of FIG. 6A, and a spacer disposed therebetween and maintaining four balls, in accordance with the principle of the invention.
Figure 6A:
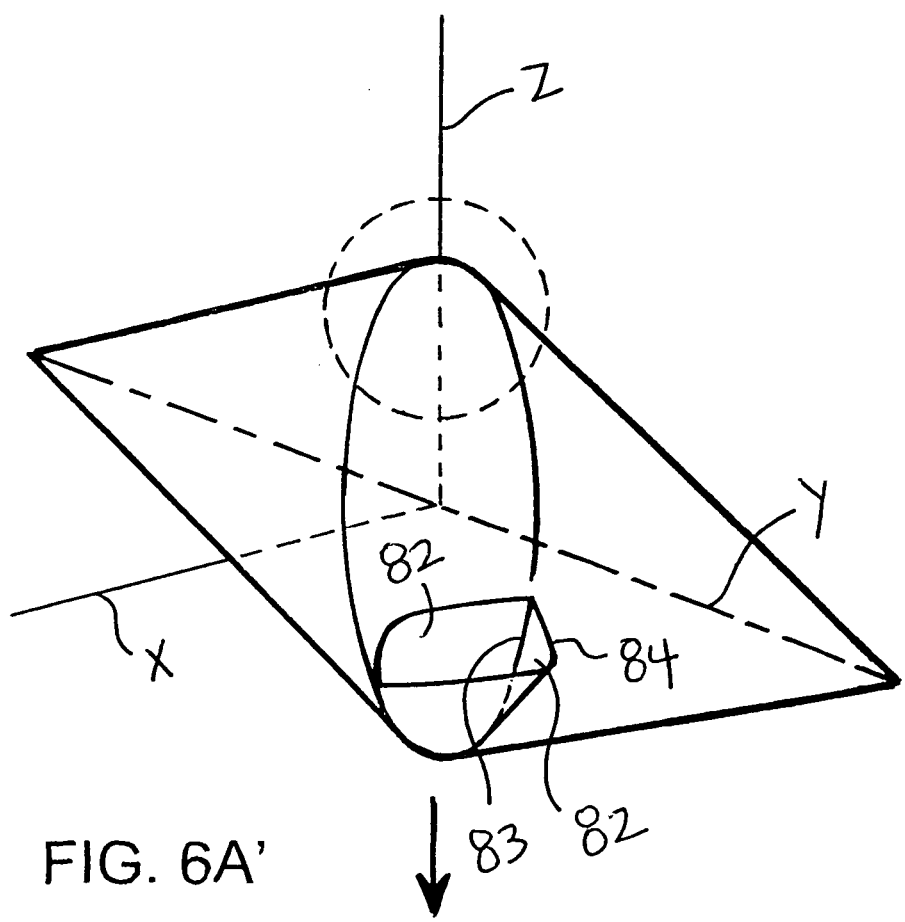

FIGS. 6B and 6C illustrates a kinematic mount 87 including opposing plates 86A and 86B each fashioned from blocks 80. Plate 86A is fashioned from four blocks 80, which are rigidly affixed together, such as by welding. Plate 86B is also fashioned from four blocks 80, which are rigidly affixed together, such as by welding. Plates 86A and 86B are each fashioned from four blocks 80. Although four blocks 80 are used in the construction of plate 86A, less or more can be used. Also, although four blocks 80 are used in the construction of plate 86B, less or more can be used. Kinematic mount 87 further incorporates spacer 76 and four balls 75 (not visible in FIG. 6C), and at least one compliant contact point between one of the balls and a corresponding contact surface of one of the plates. FIG. 6B shows kinematic mount 87 in an unlocked position, and FIG. 6C shows kinematic mount 87 in a locked position. In all further respects, kinematic mount 87 functions like kinematic mount 73. Spacer 76 can be eliminated, if desired, and FIG. 6D illustrates this in a kinematic mount 89 including four balls 75 sandwiched between opposing plates 86A and 86B.

FIGS. 7A and 7A' illustrate yet another embodiment of a building block 90 used to construct plates of kinematic mounts, in accordance with the principle of the invention. As explained with the previous building block embodiment 80, building block 90 shares surfaces 61 and 62, edge line 85, and the corresponding X, Y and Z coordinates. In this embodiment, a cavity is formed into top surface 91, which has two second order surfaces that are lofted between circular groove line 93 and two opposing, strait, parallel lines 94 on surface 91 on the opposite sides of groove line 83. Such lofted surfaces provide two contact points for a ball and have variable slope, which translate over straight line 95, which is perpendicular to lines 94. This variable slope causes a smooth re-centering response, which constant slope surfaces cannot adequately provide.

Figure 7D:
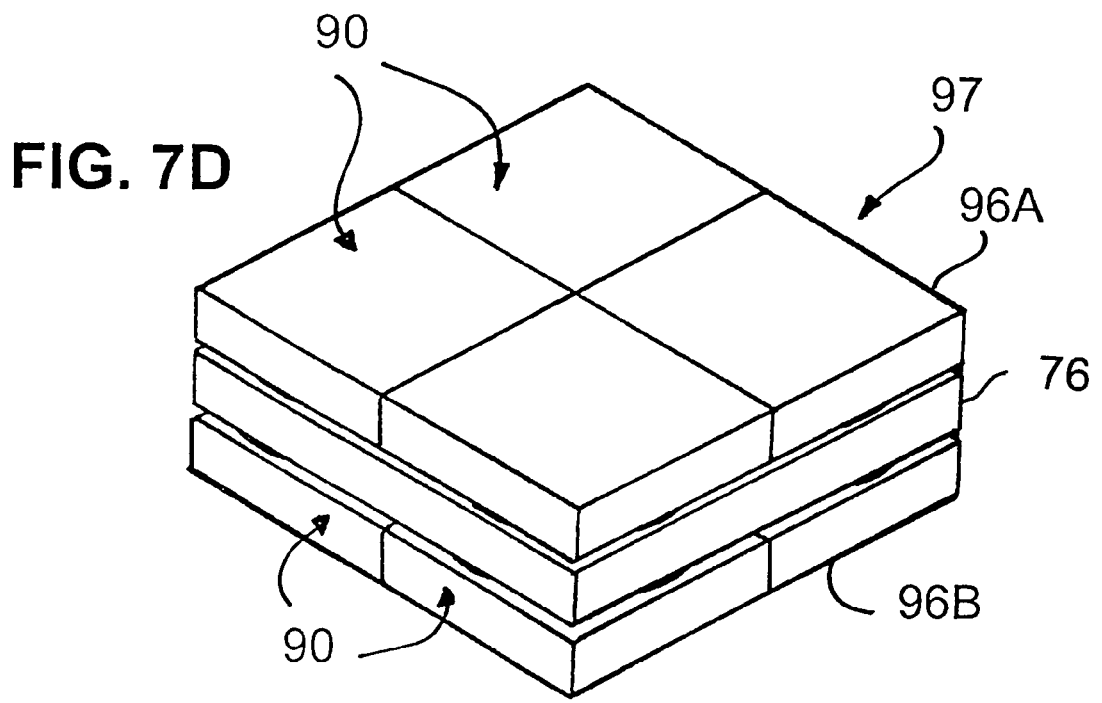
FIG. 7D is an isometric view of the kinematic mount of FIG. 7C shown as it would appear locked.

FIGS. 7C and 7D illustrates a kinematic mount 97 including opposing plates 96A and 96B each fashioned from blocks 90. Plate 96A is fashioned from four blocks 90, which are rigidly affixed together, such as by welding. Plate 96B is also fashioned from four blocks 90, which are rigidly affixed together, such as by welding. Plates 96A and 96B are each fashioned from four blocks 90. Although four blocks 90 are used in the construction of plate 96A, less or more can be used. Also, although four blocks 90 are used in the construction of plate 96B, less or more can be used.

Figure 7E:
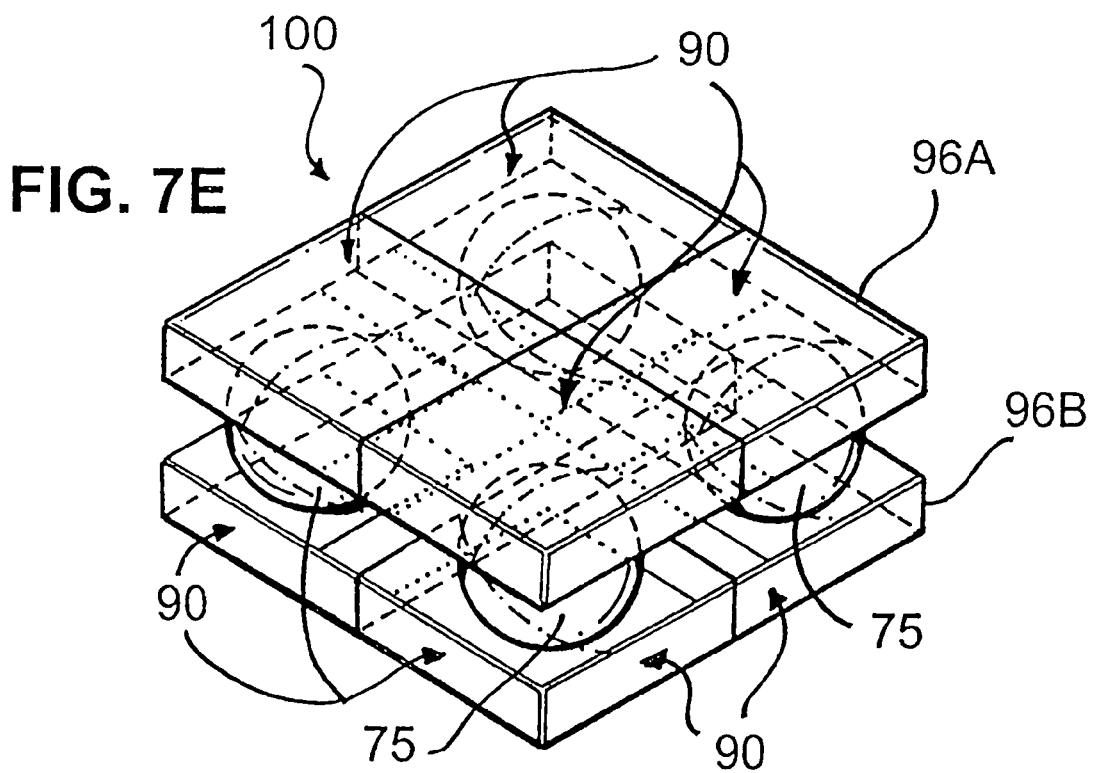
FIG. 7E is an isometric view of a kinematic mount, shown as it would appear locked and including balls positioned between opposing base plates each constructed as an assembly of the building blocks of FIG. 7B, in accordance with the principle of the invention.

Kinematic mount 97 further incorporates spacer 76 and four balls 75 (not shown in FIG. 7D), and at least one compliant contact point between one of the balls and a corresponding contact surface of one of the plates. FIG. 7C shows kinematic mount 97 in an unlocked position, and FIG. 7D shows kinematic mount 97 in a locked position. In all further respects, kinematic mount 97 functions like kinematic mounts 73 and 87. Spacer 76 can be eliminated, if desired, and FIG. 7E illustrates this in a kinematic mount 100 including four balls 75 sandwiched between opposing plates 96A and 96B.

FIG. 7B illustrates yet another building block 96 composed of two blocks 90, which are rigidly affixed together such that groove lines 93 are parallel relative to one another. Block 96 can be integrally-formed, if desired.

Figure 8A:
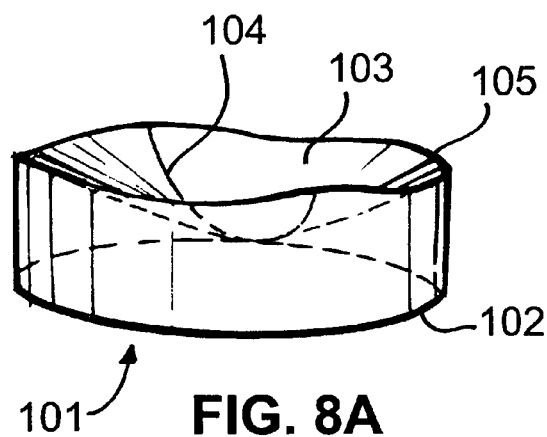
FIG. 8A is an isometric view of yet still another alternate embodiment of a building block for use in constructing plates for kinematic mounts, in accordance with the principle of the invention.

FIG. 8A illustrates yet still another embodiment of a building block 101 used to fashion plates of kinematic mounts, in accordance with the principle of the invention. Block 101 is cylindrical, and can be easily machined from bar stock and used as hardened inserts in base plates. Block 101 has a round base 102, two conical surfaces 103 providing two ball contact points, a circular groove line 104, and a top perimeter spatial curve 95. Block 101 is useful in small-scale applications. Building block 101 is arranged in a kinematic mount like that of the other building blocks disclosed herein, and it is to be understood that the discussions of the previous building blocks of the invention apply to building block 101 in this regard.

Figure 8B:
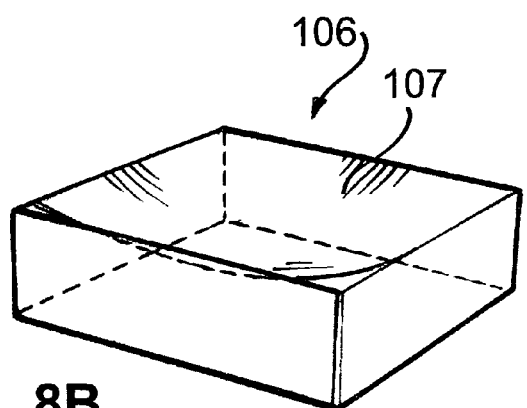
FIG. 8B is an isometric view of still a further alternate embodiment of a building block for use in constructing plates for kinematic mounts, in accordance with the principle of the invention.

FIG. 8B illustrates yet a further embodiment of a building block 106 used to fashion base plates of kinematic mounts. Block 106 has square or rectangular base and a double second order hyperbolic paraboloid lofted surface 107, which provides two ball contact points. The groove line of surface 107 vanishes because of variable radiuses of guide curves across such groove line (not shown). The "groove line effect" however shows up in the dynamic response of kinematic mounts built solely of blocks 106. Thus, the groove line of block 106 is latent, but real. Surface 107 can be referred to as a dome as long as it does not exceed second order geometry. Higher order kinematic surfaces have disadvantage in the proposed field of application, thus are not subject of this invention. Block 106 is preferably used for large-scale applications requiring surface 107 to be large. Quake and blast induced gravity field disturbance balance requires such large size block 106. Sea-based rigs and large vessels such as aircraft carriers and cruise liners have steady state gravity field inclination imbalances, and can take advantage of the disclosed kinematic mounts incorporating large plates fashioned of large blocks 106. Building block 106 is arranged in a kinematic mount like that of the other building blocks disclosed herein, and it is to be understood that the discussions of the previous building blocks of the invention apply to building block 106 in this regard.

Figure 8C:
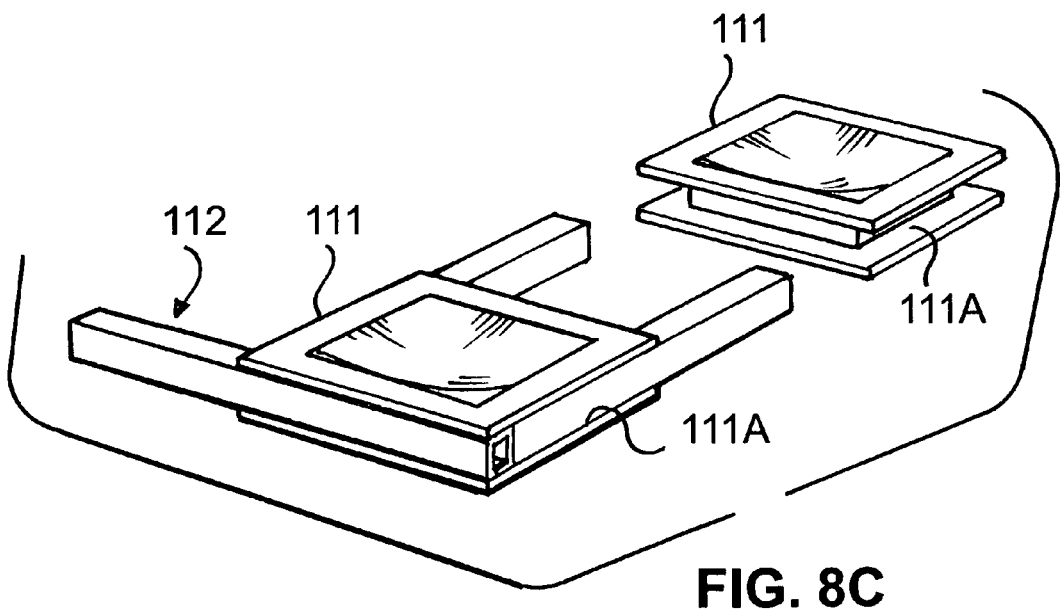
FIG. 8C is an isometric view of yet a further alternate embodiment of a building block for use in constructing plates for kinematic mounts, and a frame for use in assembling a plurality of such building blocks to form base plates for kinematic mounts, in accordance with the principle of the invention.

Large-scale kinematic mounts may require widely separated blocks framed together. One such framing is shown next. Note that more than three balls in a kinematic mount require frame flexibility of the framing that holds the block together, which provides the compliance that is required in kinematic mounts incorporating more than three balls, such as four or more. Consistent with this, FIG. 8C shows a partially-assembled kinematic mount 110 including two blocks 111, which have the same surface cavity as block 106, further details of which will not be discussed. The instruction provided in FIG. 8C is that blocks 111 are joined with a frame 112 to form a plate, in which blocks 111 incorporate outwardly-directed parametric grooves 111A for accepting frame 112, in which welding, bolts, screws, or the like is then used to rigidly affix blocks 111 to frame 112. Any number of blocks can be fashioned into a plate with a frame, and the frame can take on any desired form and any suitable way of affixing the blocks to a frame can be used without departing from the invention. The blocks can be positioned next to one another, or spaced apart, and even wide apart, from one another if desired, and this will depend on the specific application.

Figure 8D:
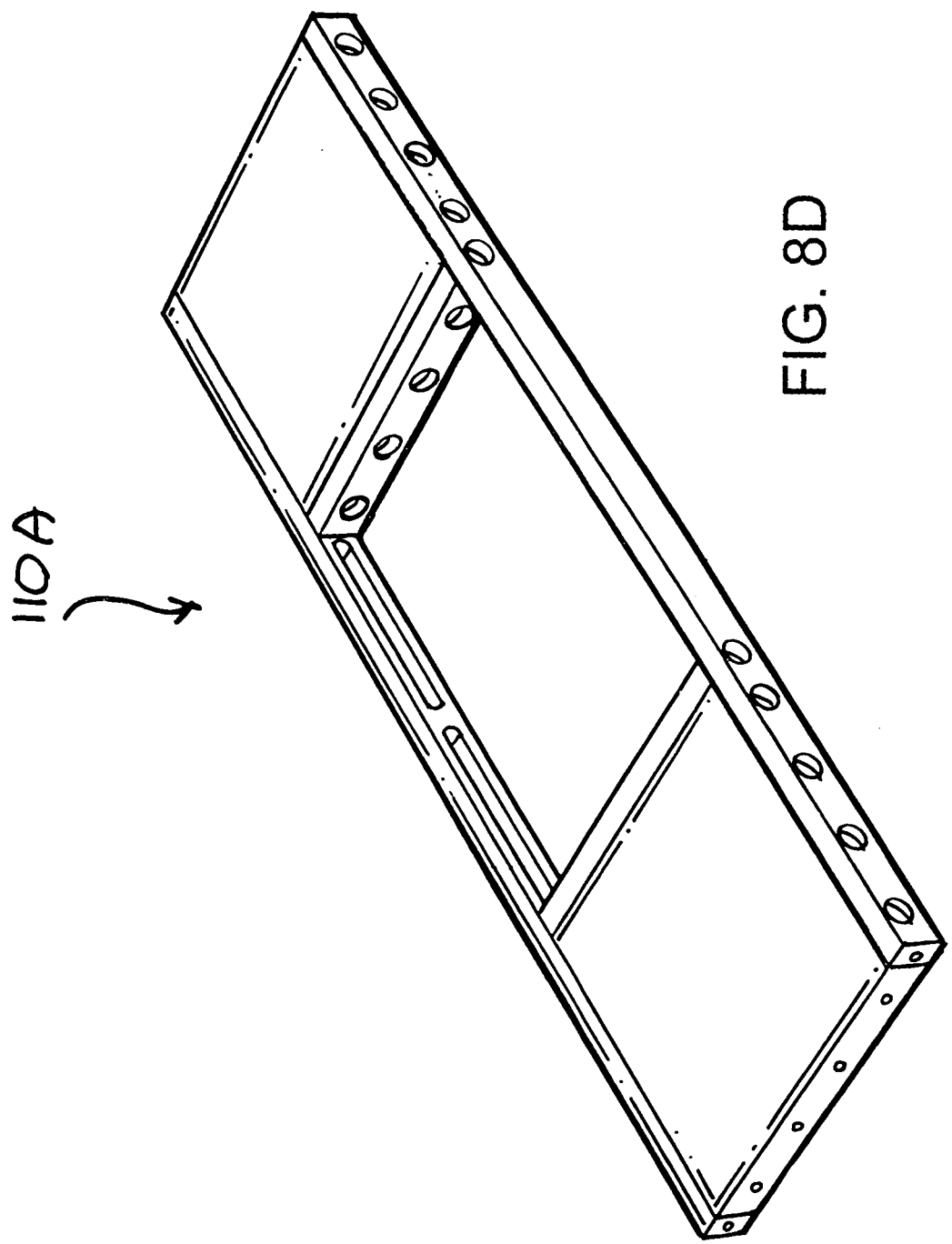
FIG. 8D is an isometric view of a plate for a kinematic mount incorporating two building blocks attached to a frame.
Figure 8E:
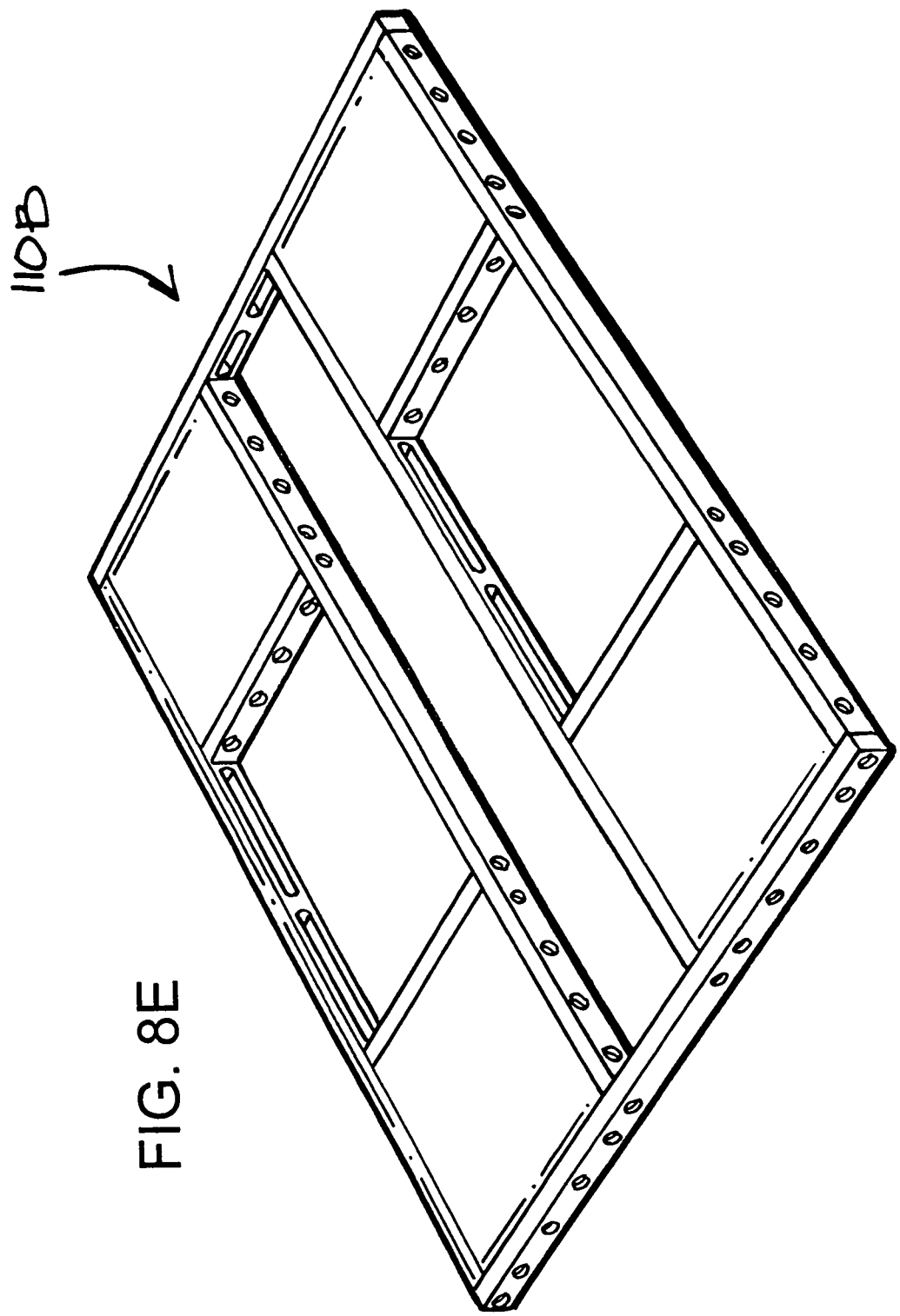
FIG. 8E is an isometric view of a plate for a kinematic mount incorporating four building blocks attached to a frame.
Figure 8F:
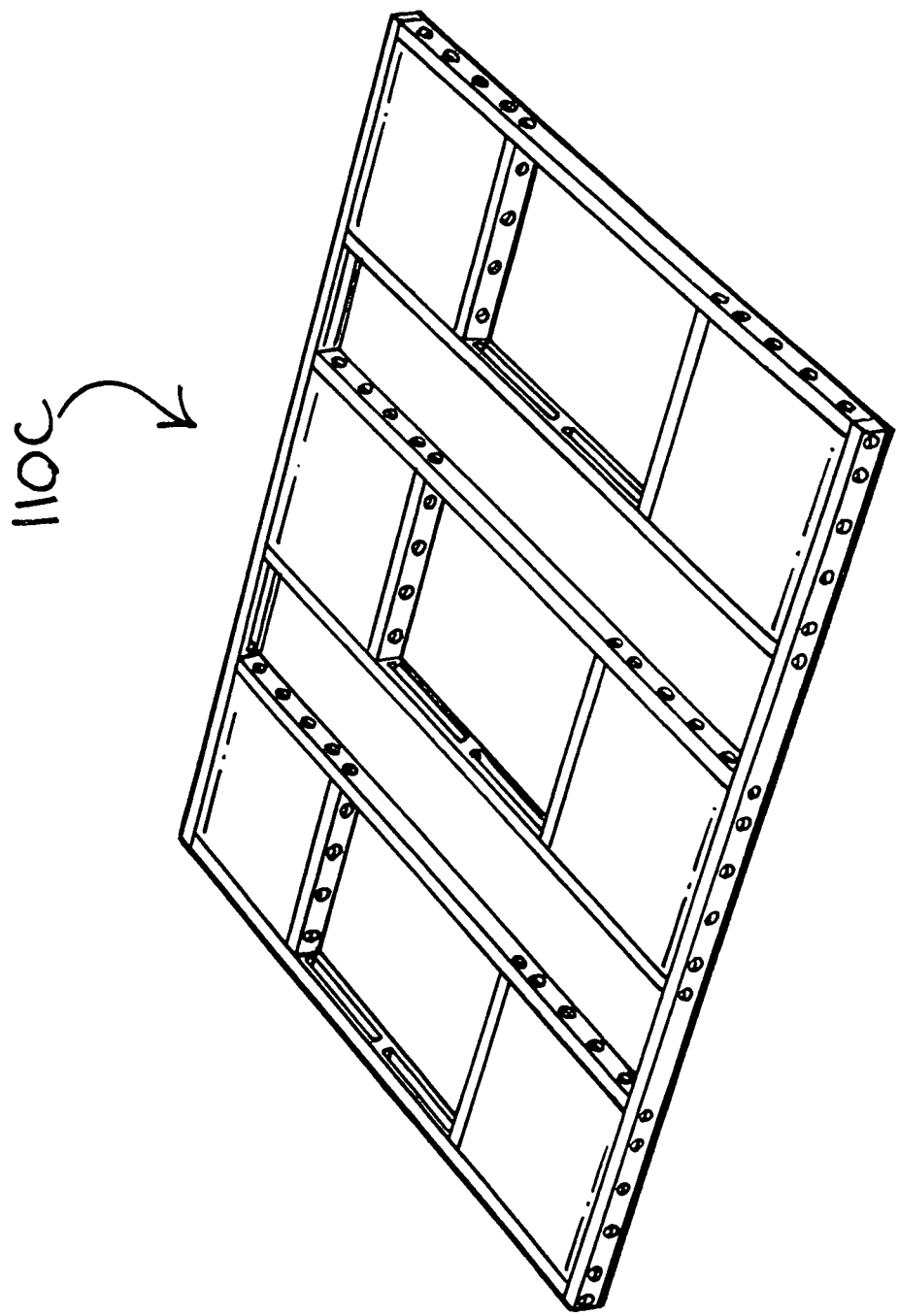
FIG. 8F is an isometric view of a plate for a kinematic mount incorporating six building blocks attached to a frame.

As a matter of illustration, FIG. 8D shows a kinematic mount 110A including two blocks joined with a frame, FIG. 8E shows a kinematic mount 110B including four blocks joined with a frame, and FIG. 8F shows a kinematic mount 110C including six blocks joined with a frame. The blocks of mounts 110A, 110B, and 110C can have any desired cavity geometry consistent with this disclosure. Any number of blocks secured by a frame can be used in a plate for a kinematic mount without departing from the invention.

FIG. 9 illustrates a truss assembly 113, which included a plate 114 with a central, annular seat 115 which mates with a ball of a large-scale kinematic mount constructed and arranged in accordance with the principle of the invention as disclosed herein. Plate 114 has a plurality of spaced-apart holes 116 arranged circumferentially around seat 115 to receive framing struts 117. Struts 117 are bolted to plate 114, although the bolts are not shown in FIG. 9.

Building blocks having surface cavities with multiple groove lines are practical and my be advantageous over the single groove cavity surfaces of the building blocks thus far disclosed herein. As a matter of illustration, FIG. 10 illustrates a further embodiment of a building block 120 used to construct base plates of kinematic mounts, in accordance with the principle of the invention. Block 120 includes a surface cavity of double, intersecting groove lines of 121 and 122, which are diagonal to the square or rectangular base 127 of block 120. Two circular or parabolic surfaces 123 and 124 are lofted between groove line 121 and perimeter line 125 and between groove line 122 and perimeter line 126, respectively, in which are formed quadrant surfaces with central symmetry.

Figure 11:
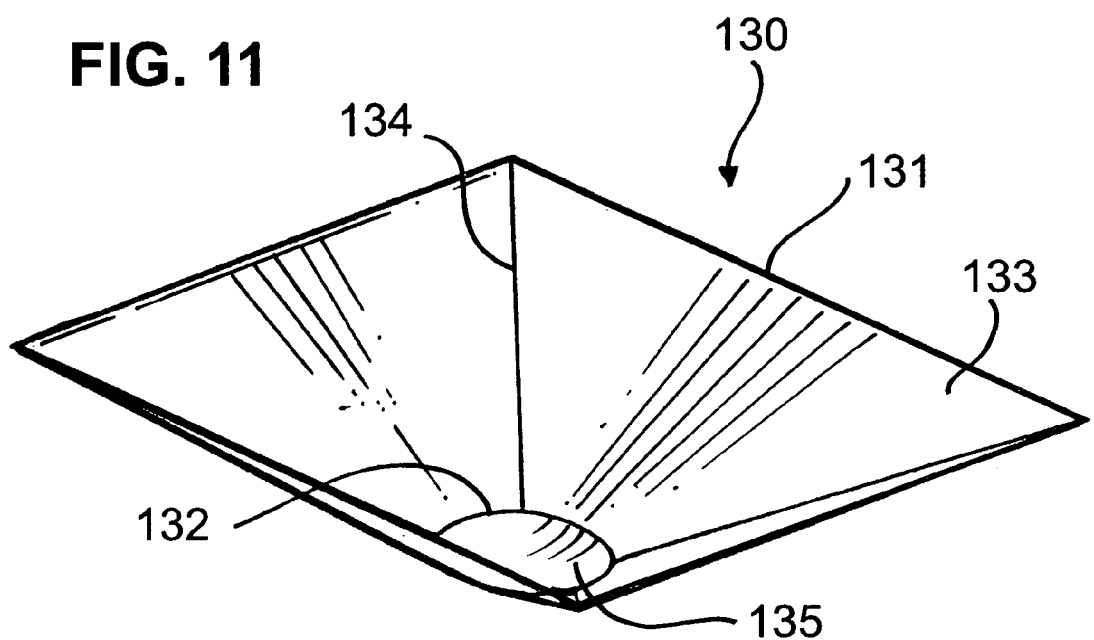
FIG. 11 illustrates an embodiment of a surface cavity configuration that may be employed with a building block used to construct plates for kinematic mounts, in accordance with the principle of the invention.

The construction of similar central symmetric cavity surfaces of multiple groove lines, say three or more groove lines and hyperbolic-paraboloid quadrants, is instructive within the teachings of this invention. To further illustrate this, FIG. 11 shows a surface cavity 130 of a preferred embodiment of this invention, which is lofted between square perimeter line 131 and circular guide line 132, wherein lines 131 and 132 are disposed in opposing, parallel planes perpendicular to the acceleration field. Loft surface 133 is a single surface, which appears to be quadrant and split by pseudo groove lines 134. Spherical surface 135, which is tangential to loft surface 133, closes the bottom of this surface cavity. Note that such a loft is hyperbolic-paraboloid, which is still a second order surface. And so while FIG. 10 shows lofted surfaces incorporating intersecting groove lines, the embodiment in FIG. 11 shows a configuration of a surface cavity incorporating non-intersecting groove lines.

Figure 12:
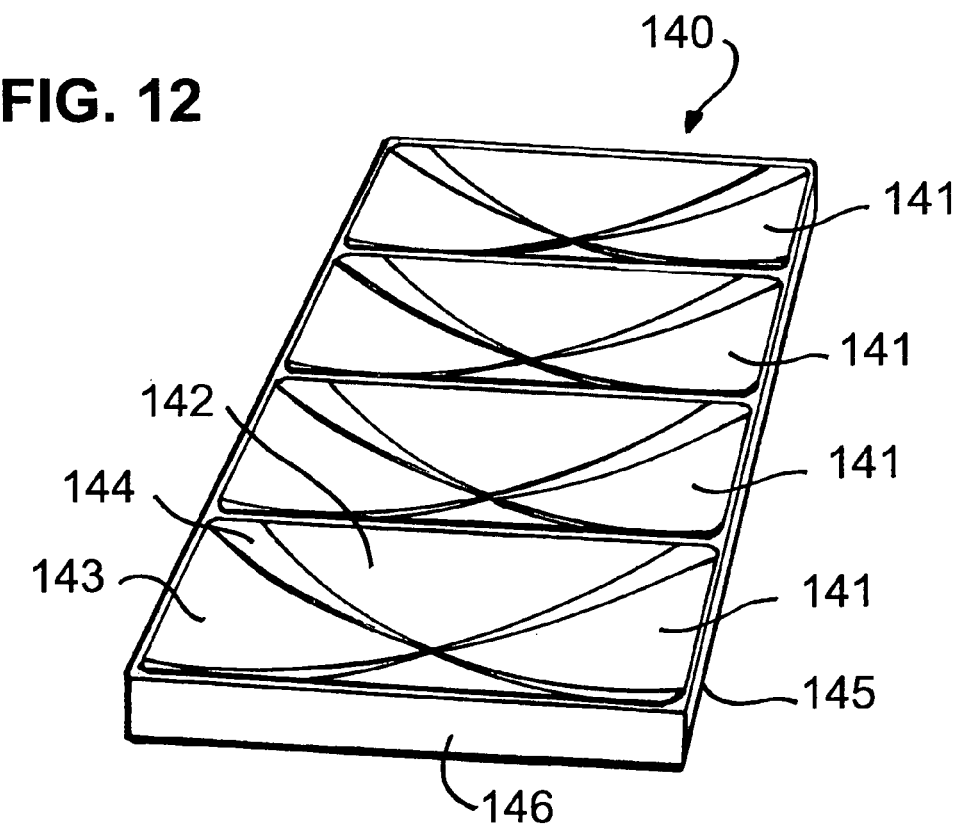
FIG. 12 is an isometric view of yet another embodiment of a building block for use in constructing plates for kinematic mounts, in accordance with the principle of the invention.

Attention is now directed to FIG. 12, in which there is seen yet another building block 140 used to fashion base plates of kinematic mounts. Block 140 includes four consecutive surface cavities 141. Each cavity 141 has a opposing side cylindrical surfaces 142 with rounded groove lines, and opposing end cylindrical surfaces 143 with rounded groove lines, in which the rounded groove lines are each denoted at 144 and have constant radius surface. Cavities 141 are suitable to receive load bearing balls of higher rigidity and less damping, or non-bearing balls of softer material with high damping.

Side wall 145 of block 140 can receive connector blocks to couple more plates 140 to form a bearing bed or track. End wall 146 is suitable to receive end bars for the same coupling purpose instead.

Figure 13:
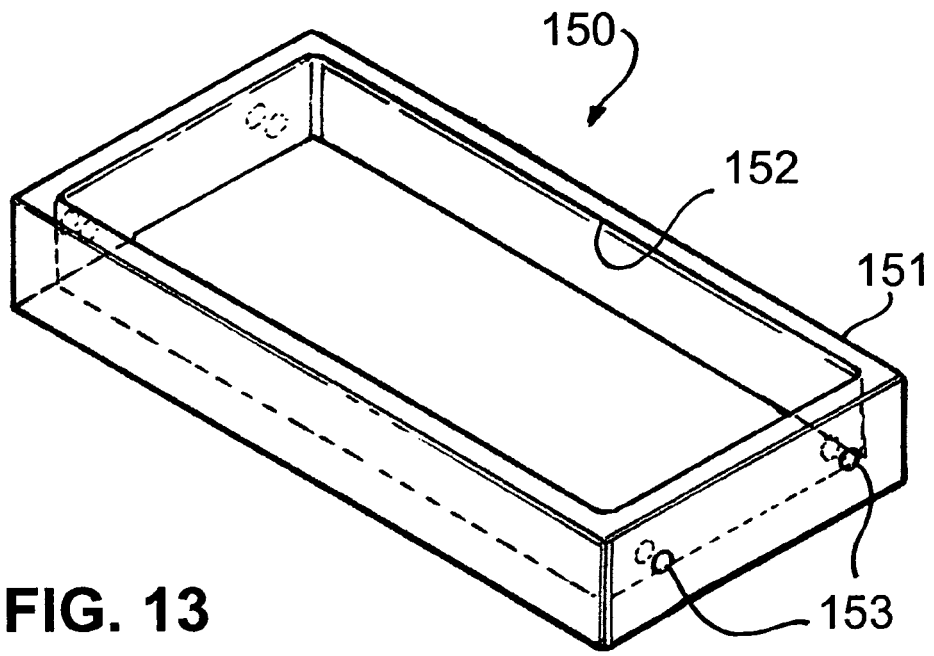
FIG. 13 is an isometric view of a coupling used to interconnect building blocks each constructed and arranged in accordance with the building block set forth in FIG. 12 to form plates for kinematic mounts, in accordance with the principle of the invention.
Figure 14:
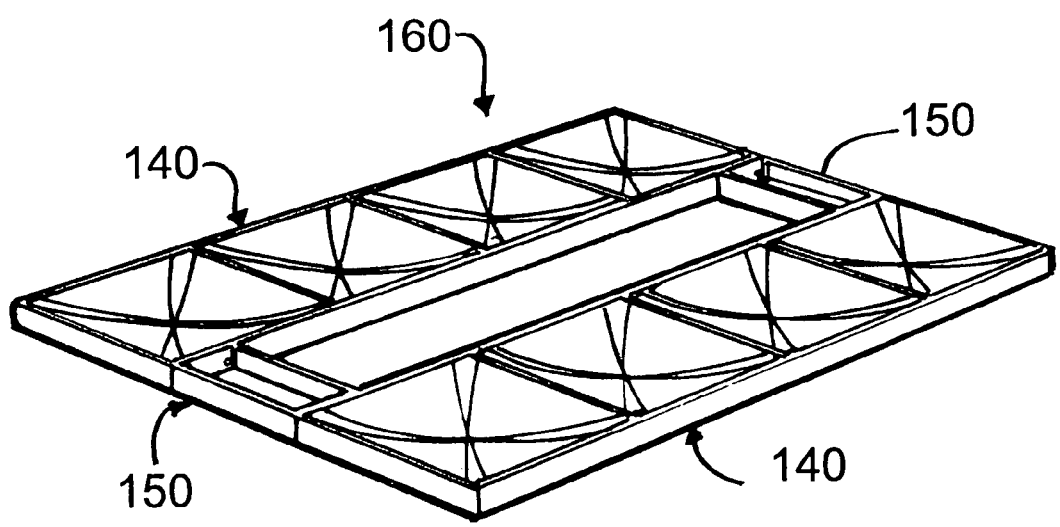
FIG. 14 is an isometric view of plates for a kinematic mount each constructed and arranged in accordance with the building block of FIG. 12, which are joined with couplings each constructed and arranged in accordance with the coupler block of FIG. 13, in accordance with the principle of the invention.

As a matter of example, FIG. 13 illustrates a coupling 150 used to couple together plates 140 to form a large-scale plate for use in a kinematic mount. In this embodiment, coupling 150 includes a cavity 152 formed into an upper surface 151 forming four short-sided sidewalls. The short sidewalls have holes 153 to receive bolts or screws to couple block 150 to plates 140. Looking to FIG. 14, there is a framed platform 160 formed by plates 140 and couplings 150. More couplings and plates can add up to larger-scale tracks or plates, which are suitable to receive multi-ganged electronics cabinets and other payload units.

Figure 15A:
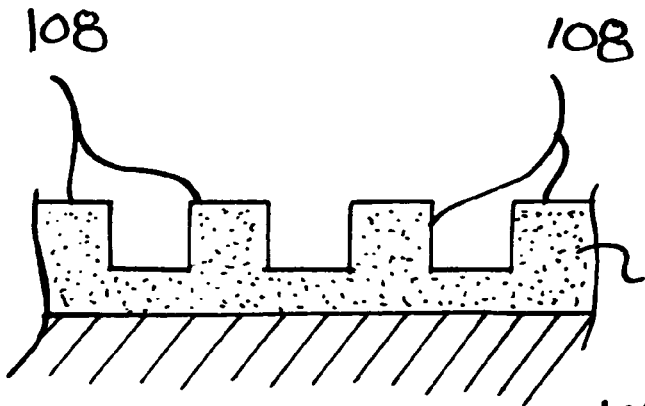
FIG. 15A is a top plan view of a compliant surface layer for introducing compliance to a kinematic mount.
Figure 15B:
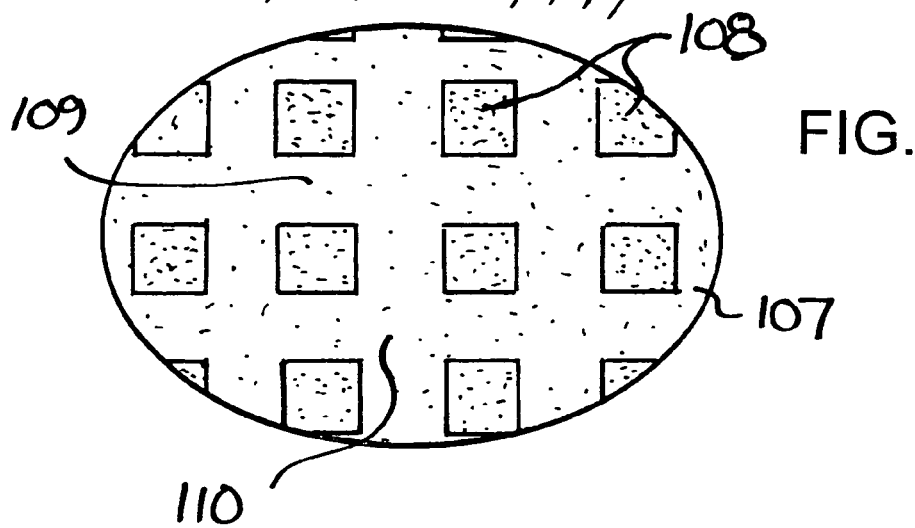
FIG. 15B is a vertical sectional view of the compliant surface layer of FIG. 15A.
Figure 16:
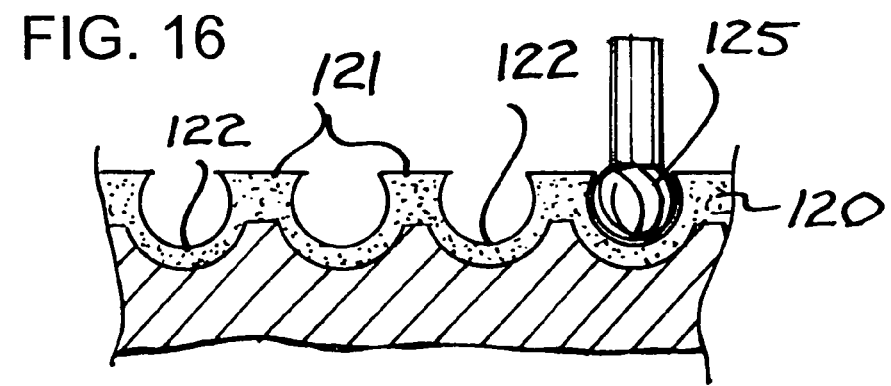
FIG. 16 is a vertical sectional view of an alternate embodiment of a compliant surface layer for introducing compliance to a kinematic mount.

When additional damping is needed, the surface of the surface cavities on which said balls roll can be treated with as compliant surface layers including, for instance, one-way grooves, or two-way grooves, formed by blunt, trapezoidal, drill point, or ball point cutters, contact condition 41, contact condition 42, etc. A ball surface can also be surface treated by a dense array of dimples or shallow bores, which are more practical on a spherical surface the grooves. In this regard, FIGS. 15A and 15B illustrates an elastomer layer 107 that can be applied and used to form a compliant contact between a ball and a surface of a cavity of a plate of a kinematic mounted constructed and arranged in accordance with the principle of the invention. Layer 107 can be applied to a ball, and/or to a contact surface of a plate, i.e., a plate cavity. Layer 107 includes a grid or matrix of parallel rows of spaced-apart towers 108 divided by intersecting longitudinal and latitudinal valleys 109 and 110. Balls, while rolling on layer 107, attain more rolling resistance, providing enhanced damping. In the embodiment depicted in FIGS. 15A and 15B, towers 108 are generally square. In FIG. 16, an alternate embodiment of an elastomer layer 120 is shown, which includes mushroom-shaped towers 121 separated by valleys 122 cut by ball point cutter 125, in which valleys 122 are rounded in shape. Other shapes for towers and valleys may be used without departing from the invention.

Figure 17:
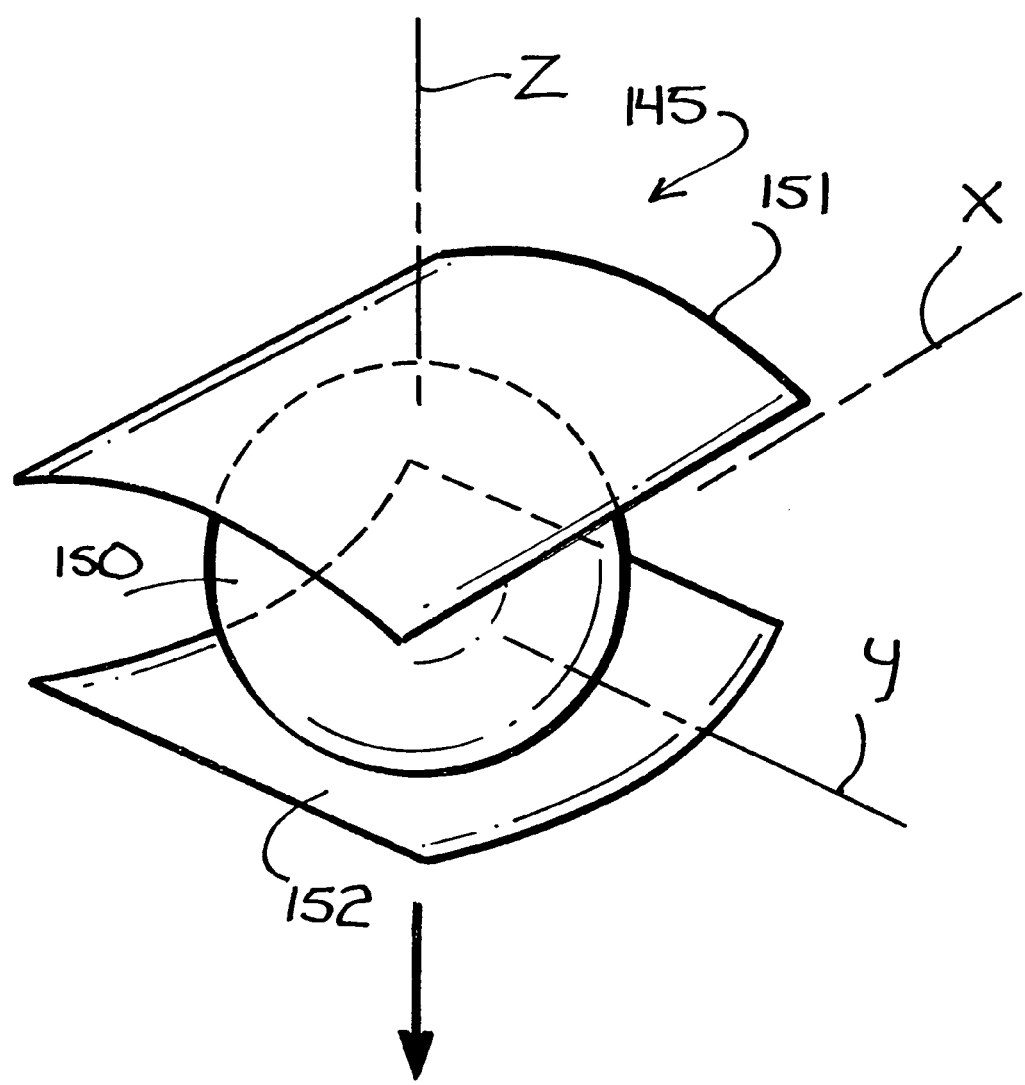
FIG. 17 is a schematic representation of a ball contact geometry.

The present invention is described above with reference to preferred embodiments. However, those skilled in the art will recognize that changes and modifications may be made in the described embodiments without departing from the nature and scope of the present invention. For instance, referring to FIG. 17 there is seen a schematic representation of a ball contact geometry 145 including a ball 150 contacting opposing top and bottom cavities 151 and 152, in which the bottom cavity 152 rotation about axis X is orthogonal to the top cavity 151 rotation about Y, and in which both rotations are orthogonal to the acceleration field Z, which, in this embodiment, is aligned with gravity. Orthogonal and wedge-shaped cavities as contact surfaces for a ball can be used as in FIG. 17 for plates in a kinematic mounted constructed and arranged in accordance with the principles of the invention. The geometry in FIG. 2B' can be arranged as with the geometry of FIG. 17, if so desired. As a matter of reference, lofted surface S of cavity S' in the embodiment depicted in FIG. 2B' represents substantially the same cavity geometry, shown in cross section, as in each of cavities 151 and 152. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus for reducing vibrations and shocks, comprising:
   three balls;
   a first plate, and an opposing second plate;
   the first plate contacting the three balls at six contact points constraining translational and rotational movement of the first plate; and
   the second plate contacting the three balls at six contact points constraining translational and rotational movement of the second plate.

2. Apparatus of claim 1, further comprising:
   a spacer having opposing first and second faces and three bores extending therethrough from the first face to the second face;
   the three balls each disposed in one of the three bores for rotation relative to the spacer, the three balls projecting outboard of the first and second faces;
   the first plate in juxtaposition to the first face; and
   the second plate in juxtaposition to the second face.

3. Apparatus of claim 1, further comprising:
   a fourth ball;
   the first plate contacting the fourth ball at a first contact point; and
   the second plate contacting the fourth ball at a second contact point;
   wherein at least one of the first and second contact points is a compliant contact point.

4. Apparatus of claim 3, further comprising:
   a spacer having opposing first and second faces and four bores extending therethrough from the first face to the second face;
   the three balls and the fourth ball each disposed in one of the four bores for rotation relative to the spacer, the four balls projecting outboard of the first and second faces;
   the first plate in juxtaposition to the first face; and
   the second plate in juxtaposition to the second face.

5. Apparatus of claim 3, wherein the compliant contact point is provided by an elastomer at the contact point.

6. Apparatus of claim 5, further comprising an elastoplastic material applied to the elastomer.

7. Apparatus of claim 5, wherein the elastomer is carried by one of the fourth ball, the first plate, and the second plate.

8. Apparatus of claim 1, wherein the first plate is fashioned from a plurality of rigidly-affixed blocks.

9. Apparatus of claim 1, wherein the second plate is fashioned from a plurality of rigidly-affixed blocks.

10. Apparatus of claim 1, wherein the first plate is fashioned of blocks held by, and secured to, a frame.

11. Apparatus of claim 1, wherein the second plate is fashioned of blocks held by, and secured to, a frame.

12. Apparatus for reducing vibrations and shocks, comprising:
   a spacer having opposing first and second faces and three bores extending therethrough from the first face to the second face;
   three balls each disposed in one of the three bores for rotation relative to the spacer, the three balls projecting outboard of the first and second faces;
   a first plate in juxtaposition to the first face and contacting the three balls at six contact points constraining translational and rotational movement of the first plate; and
   a second plate in juxtaposition to the second face and contacting the three balls at six contact points constraining translational and rotational movement of the second plate.

13. Apparatus of claim 12, further comprising:
a fourth bore extending through the spacer from the first face to the second face;
a fourth ball disposed in the fourth bore for rotation relative to the spacer, the fourth ball projecting outboard of the first and second faces;
the first plate contacting the fourth ball at a first contact point; and
the second plate contacting the fourth ball at a second contact point;
wherein at least one of the first and second contact points is a compliant contact point.

14. Apparatus of claim 13, wherein the compliant contact point is provided by an elastomer at the contact point.

15. Apparatus of claim 14, wherein the elastomer is carried by one of the fourth ball, the first plate, and the second plate.

16. Apparatus of claim 14, further comprising an elasto-plastic material applied to the elastomer layer.

17. Apparatus of claim 12, wherein the first plate is fashioned from a plurality of rigidly-affixed blocks.

18. Apparatus of claim 12, wherein the second plate is fashioned from a plurality of rigidly-affixed blocks.

19. Apparatus of claim 12, wherein the first plate is fashioned of blocks held by, and secured to, a frame.

20. Apparatus of claim 12, wherein the second plate is fashioned of blocks held by, and secured to, a frame.

21. Apparatus for reducing vibrations and shocks, comprising:
three balls;
at least one additional ball comprising a fourth ball;
a first plate, and an opposing second plate;
the first plate contacting the three balls at six contact points constraining translational and rotational movement of the first plate;
the second plate contacting the three balls at six contact points constraining translational and rotational movement of the second plate;
the first plate contacting the fourth ball at a first contact point; and
the second plate contacting the fourth ball at a second contact point;
wherein at least one of the first and second contact points is a compliant contact point.

22. Apparatus of claim 21, further comprising:
a spacer having opposing first and second faces and four bores extending therethrough from the first face to the second face;
the three balls and the fourth ball each disposed in one of the four bores for rotation relative to the spacer, the four balls projecting outboard of the first and second faces;
the first plate in juxtaposition to the first face; and
the second plate in juxtaposition to the second face.

23. Apparatus of claim 21, wherein the compliant contact point is provided by an elastomer at the contact point.

24. Apparatus of claim 23, further comprising an elasto-plastic material applied to the elastomer.

25. Apparatus of claim 23, wherein the elastomer is carried by one of the fourth ball, the first plate, and the second plate.

26. Apparatus of claim 21, wherein the first plate is fashioned from a plurality of rigidly-affixed blocks.

27. Apparatus of claim 21, wherein the second plate is fashioned from a plurality of rigidly-affixed blocks.

28. Apparatus of claim 21, wherein the first plate is fashioned of blocks held by, and secured to, a frame.

29. Apparatus of claim 21, wherein the second plate is fashioned of blocks held by, and secured to, a frame.

30. Apparatus for reducing vibrations and shocks, comprising:
a spacer having opposing first and second faces and bores extending therethrough from the first face to the second face;
three balls;
at least one additional ball comprising a fourth ball;
the three balls and the fourth ball each disposed in one of the bores for rotation relative to the spacer, the four balls projecting outboard of the first and second faces;
a first plate in juxtaposition to the first face and contacting the three balls at six contact points constraining translational and rotational movement of the first plate;
a second plate in juxtaposition to the second face and contacting the three balls at six contact points constraining translational and rotational movement of the second plate;
the first plate contacting the fourth ball at a first contact point; and
the second plate contacting the fourth ball at a second contact point;
wherein at least one of the first and second contact points is a compliant contact point.

31. Apparatus of claim 30, wherein the compliant contact point is provided by an elastomer at the contact point.

32. Apparatus of claim 31, wherein the elastomer is carried by one of the fourth ball, the first plate, and the second plates.

33. Apparatus of claim 31, further comprising an elasto-plastic material applied to the elastomer.

34. Apparatus of claim 30, wherein the first plate is fashioned from a plurality of rigidly-affixed blocks.

35. Apparatus of claim 30, wherein the second plate is fashioned from a plurality of rigidly-affixed blocks.

36. Apparatus of claim 30, wherein the first plate is fashioned of blocks held by, and secured to, a frame.

37. Apparatus of claim 30, wherein the second plate is fashioned of blocks held by, and secured to, a frame.

* * * * *